(12) United States Patent
Lazarev

(10) Patent No.: US 9,916,931 B2
(45) Date of Patent: Mar. 13, 2018

(54) ENERGY STORAGE DEVICES AND METHODS OF PRODUCTION THEREOF

(71) Applicant: Capacitor Sciences Incorporated, Menlo Park, CA (US)

(72) Inventor: Pavel Ivan Lazarev, Menlo Park, CA (US)

(73) Assignee: CAPACITOR SCIENCE INCORPORATED, Menlo Park, CA (US)

( * ) Notice: Subject to any disclaimer, the term of this patent is extended or adjusted under 35 U.S.C. 154(b) by 0 days.

(21) Appl. No.: 14/931,757

(22) Filed: Nov. 3, 2015

(65) Prior Publication Data

US 2016/0314901 A1 Oct. 27, 2016

Related U.S. Application Data

(60) Provisional application No. 62/075,145, filed on Nov. 4, 2014.

(51) Int. Cl.
*H01G 4/14* (2006.01)
*C08L 33/02* (2006.01)
(Continued)

(52) U.S. Cl.
CPC ............... *H01G 4/14* (2013.01); *C08L 33/02* (2013.01); *C08L 79/00* (2013.01); *H01G 4/30* (2013.01); *C08L 2203/20* (2013.01)

(58) Field of Classification Search
None
See application file for complete search history.

(56) References Cited

U.S. PATENT DOCUMENTS 3,407,394 A 10/1968 Hartke
4,694,377 A 9/1987 MacDougall et al.
(Continued)

FOREIGN PATENT DOCUMENTS

CN 203118781 U 8/2013
CN 203377785 U 1/2014
(Continued)

OTHER PUBLICATIONS

International Search Report and Written Opinion for International Application No. PCT/US2016/019641, dated Jul. 12, 2016.
(Continued)

*Primary Examiner* — Dion R Ferguson
(74) *Attorney, Agent, or Firm* — JDI Patent; Joshua Isenberg; Robert Pullman

(57) ABSTRACT

The present disclosure provides an energy storage device comprising a first electrode, a second electrode, and a solid multilayer structure disposed between said first and second electrodes. The solid multilayer structure can be in contact with said first and second electrodes. The solid multilayer structure can include layers disposed parallel to said electrodes, the layers have a sequence $(A-B)_m-A$, wherein, A is an insulating layer and B is a polarization layer comprising a colloidal composite with a micro-dispersion of electro-conductive nano-particles in an insulator matrix, and 'm' is a number greater than or equal to 1. Layer A can have a breakdown voltage of at least about 0.05 volts per nanometer (nm), and layer B can have a dielectric permittivity of at least about 100.

31 Claims, 2 Drawing Sheets

(51) Int. Cl.
*C08L 79/00* (2006.01)
*H01G 4/30* (2006.01)

(56) References Cited

U.S. PATENT DOCUMENTS

| | | |
|---|---|---|
| 4,702,562 A | 10/1987 | Scheuble et al. |
| 4,894,186 A | 1/1990 | Gordon et al. |
| 5,187,639 A | 2/1993 | Ogawa et al. |
| 5,248,774 A | 9/1993 | Dietz et al. |
| 5,312,896 A | 5/1994 | Bhardwaj et al. |
| 5,384,521 A | 1/1995 | Coe |
| 5,395,556 A | 3/1995 | Drost et al. |
| 5,466,807 A | 11/1995 | Dietz et al. |
| 5,514,799 A | 5/1996 | Varanasi et al. |
| 5,581,437 A | 12/1996 | Sebillotte et al. |
| 5,583,359 A | 12/1996 | Ng et al. |
| 5,679,763 A | 10/1997 | Jen et al. |
| 5,742,471 A | 4/1998 | Barbee et al. |
| 5,840,906 A | 11/1998 | Zoltewicz et al. |
| 5,880,951 A | 3/1999 | Inaba |
| 6,282,081 B1 | 8/2001 | Takabayashi et al. |
| 6,294,593 B1 | 9/2001 | Jeng et al. |
| 6,341,056 B1 | 1/2002 | Allman et al. |
| 6,391,104 B1 | 5/2002 | Schulz |
| 6,426,861 B1 | 7/2002 | Munshi |
| 6,501,093 B1 | 12/2002 | Marks |
| 6,617,830 B2 | 9/2003 | Nozu et al. |
| 6,798,642 B2 | 9/2004 | Decker et al. |
| 7,025,900 B2 | 4/2006 | Sidorenko et al. |
| 7,033,406 B2 | 4/2006 | Weir et al. |
| 7,211,824 B2 | 5/2007 | Lazarev |
| 7,460,352 B2 | 12/2008 | Jamison et al. |
| 7,466,536 B1 | 12/2008 | Weir et al. |
| 7,498,689 B2 | 3/2009 | Mitani et al. |
| 7,579,709 B2 | 8/2009 | Goetz et al. |
| 7,625,497 B2 | 12/2009 | Iverson et al. |
| 7,750,505 B2 | 7/2010 | Ichikawa |
| 7,808,771 B2 | 10/2010 | Nguyen et al. |
| 7,837,902 B2 | 11/2010 | Hsu et al. |
| 7,888,505 B2 | 2/2011 | Doutova et al. |
| 7,893,265 B2 | 2/2011 | Facchetti et al. |
| 7,910,736 B2 | 3/2011 | Koenemann et al. |
| 7,947,199 B2 | 5/2011 | Wessling |
| 8,143,853 B2 | 3/2012 | Jestin et al. |
| 8,222,074 B2 | 7/2012 | Lazarev |
| 8,231,809 B2 | 7/2012 | Pschirer et al. |
| 8,236,998 B2 | 8/2012 | Nagata et al. |
| 8,344,142 B2 | 1/2013 | Marder et al. |
| 8,404,844 B2 | 3/2013 | Kastler et al. |
| 8,527,126 B2 | 9/2013 | Yamamoto et al. |
| 8,552,179 B2 | 10/2013 | Lazarev |
| 8,818,601 B1 | 8/2014 | G V et al. |
| 8,929,054 B2 | 1/2015 | Felten et al. |
| 8,938,160 B2 | 1/2015 | Wang |
| 9,056,676 B1 | 6/2015 | Wang |
| 9,293,260 B2 | 3/2016 | Schmid et al. |
| 9,733,406 B2 | 8/2017 | Doutova et al. |
| 2002/0027220 A1 | 3/2002 | Wang et al. |
| 2002/0048140 A1 | 4/2002 | Gallay et al. |
| 2003/0026063 A1 | 2/2003 | Munshi |
| 2003/0102502 A1 | 6/2003 | Togashi |
| 2003/0142461 A1 | 7/2003 | Decker et al. |
| 2003/0219647 A1 | 11/2003 | Wariishi |
| 2004/0222413 A1* | 11/2004 | Hsu .................. B82Y 10/00 257/40 |
| 2005/0118083 A1 | 6/2005 | Tabuchi |
| 2006/0120014 A1 | 6/2006 | Nakamura et al. |
| 2006/0120020 A1 | 6/2006 | Dowgiallo |
| 2007/0001258 A1* | 1/2007 | Aihara ............... H01G 4/008 257/528 |
| 2007/0108940 A1 | 5/2007 | Sainomoto et al. |
| 2007/0159767 A1 | 7/2007 | Jamison et al. |
| 2008/0002329 A1 | 1/2008 | Pohm et al. |
| 2008/0150484 A1 | 6/2008 | Kimball et al. |
| 2008/0266750 A1 | 10/2008 | Wu et al. |
| 2008/0283283 A1 | 11/2008 | Abe et al. |
| 2009/0034073 A1 | 2/2009 | Lazarev |
| 2009/0040685 A1 | 2/2009 | Hiemer et al. |
| 2009/0184355 A1 | 7/2009 | Brederlow et al. |
| 2009/0191394 A1 | 7/2009 | Lazarev et al. |
| 2010/0038629 A1 | 2/2010 | Lazarev |
| 2010/0178728 A1 | 7/2010 | Zheng et al. |
| 2010/0183919 A1 | 7/2010 | Holme et al. |
| 2010/0190015 A1 | 7/2010 | Kasianova |
| 2010/0193777 A1 | 8/2010 | Takahashi et al. |
| 2010/0214719 A1 | 8/2010 | Kim et al. |
| 2010/0233491 A1 | 9/2010 | Nokel et al. |
| 2010/0255381 A1 | 10/2010 | Holme et al. |
| 2010/0269731 A1 | 10/2010 | Jespersen et al. |
| 2010/0279122 A1 | 11/2010 | Nokel et al. |
| 2010/0309696 A1 | 12/2010 | Guillot et al. |
| 2010/0315043 A1 | 12/2010 | Chau |
| 2011/0006393 A1* | 1/2011 | Cui ..................... H01G 4/206 257/532 |
| 2011/0042649 A1 | 2/2011 | Duvall et al. |
| 2011/0064892 A1 | 3/2011 | Nokel et al. |
| 2011/0079733 A1 | 4/2011 | Langhals et al. |
| 2011/0079773 A1 | 4/2011 | Wasielewski et al. |
| 2011/0110015 A1 | 5/2011 | Zhang et al. |
| 2011/0228442 A1 | 9/2011 | Zhang et al. |
| 2012/0008251 A1 | 1/2012 | Yu et al. |
| 2012/0033342 A1 | 2/2012 | Ito et al. |
| 2012/0053288 A1 | 3/2012 | Morishita et al. |
| 2012/0056600 A1 | 3/2012 | Nevin |
| 2012/0113380 A1 | 5/2012 | Geivandov et al. |
| 2012/0122274 A1 | 5/2012 | Lazarev |
| 2012/0244330 A1 | 9/2012 | Sun et al. |
| 2012/0268862 A1 | 10/2012 | Song et al. |
| 2012/0274145 A1 | 11/2012 | Taddeo |
| 2012/0302489 A1 | 11/2012 | Rodrigues et al. |
| 2013/0056720 A1 | 3/2013 | Kim et al. |
| 2013/0187475 A1 | 7/2013 | Vendik et al. |
| 2013/0194716 A1 | 8/2013 | Holme et al. |
| 2013/0215535 A1 | 8/2013 | Bellomo |
| 2013/0314839 A1 | 11/2013 | Terashima et al. |
| 2013/0342967 A1 | 12/2013 | Lai et al. |
| 2014/0035100 A1 | 2/2014 | Cho |
| 2014/0036410 A1 | 2/2014 | Okamatsu et al. |
| 2014/0098458 A1 | 4/2014 | Almadhoun et al. |
| 2014/0158340 A1 | 6/2014 | Dixler et al. |
| 2014/0185260 A1 | 7/2014 | Chen et al. |
| 2014/0268490 A1 | 9/2014 | Tsai et al. |
| 2014/0347787 A1 | 11/2014 | Fathi et al. |
| 2015/0008735 A1 | 1/2015 | Mizoguchi |
| 2015/0158392 A1 | 6/2015 | Zhao |
| 2015/0162131 A1 | 6/2015 | Felten et al. |
| 2015/0249401 A1 | 9/2015 | Eriksen et al. |
| 2015/0302990 A1 | 10/2015 | Ghosh et al. |
| 2016/0020026 A1 | 1/2016 | Lazarev |
| 2016/0020027 A1 | 1/2016 | Lazarev |
| 2016/0254092 A1 | 9/2016 | Lazarev et al. |
| 2016/0314901 A1 | 10/2016 | Lazarev |
| 2016/0340368 A1 | 11/2016 | Lazarev |
| 2016/0379757 A1 | 12/2016 | Robinson et al. |

FOREIGN PATENT DOCUMENTS

| | | |
|---|---|---|
| CN | 103986224 A | 8/2014 |
| DE | 10203918 A1 | 8/2003 |
| DE | 102010012949 A1 | 9/2011 |
| DE | 102011101304 A1 | 11/2012 |
| DE | 102012016438 A1 | 2/2014 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 0986080 A3 | 1/2004 |
| EP | 0865142 B1 | 5/2008 |
| EP | 2062944 A1 | 5/2009 |
| EP | 2260035 A2 | 12/2010 |
| EP | 2415543 A1 | 2/2012 |
| EP | 1486590 B1 | 12/2013 |
| EP | 2759480 A1 | 7/2014 |

(56) References Cited

FOREIGN PATENT DOCUMENTS

| | | |
|---|---|---|
| GB | 547853 A | 9/1942 |
| GB | 323148 A | 4/1963 |
| GB | 2084585 | 11/1983 |
| JP | 2786298 B2 | 11/1991 |
| JP | H03253014 A | 11/1991 |
| JP | 2786298 B2 | 8/1998 |
| JP | 2007287829 A | 11/2007 |
| JP | 2010106225 A | 5/2010 |
| JP | 2010160989 A | 7/2010 |
| JP | 2011029442 A | 2/2011 |
| JP | 2014139296 A | 7/2014 |
| RU | 2199450 C1 | 2/2003 |
| RU | 2512880 C2 | 4/2014 |
| WO | 1990009616 A1 | 8/1990 |
| WO | 0139305 A | 5/2001 |
| WO | 0226774 A2 | 4/2002 |
| WO | 2007078916 A2 | 7/2007 |
| WO | 2008038047 A2 | 4/2008 |
| WO | 2009158553 A2 | 12/2009 |
| WO | 2011056903 A1 | 5/2011 |
| WO | 2012012672 A2 | 1/2012 |
| WO | 2012084536 A1 | 6/2012 |
| WO | 2012122312 A1 | 9/2012 |
| WO | 2012162500 A2 | 11/2012 |
| WO | 2013009772 A1 | 1/2013 |
| WO | 20130854 A1 | 6/2013 |
| WO | 2014009686 A1 | 1/2014 |
| WO | 2015003725 A1 | 1/2015 |
| WO | 2015175522 A1 | 11/2015 |

OTHER PUBLICATIONS

International Search Report and Written Opinion for International Application No. PCT/US2016/033628, dated Sep. 1, 2016.
Non-Final Office Action for U.S. Appl. No. 14/752,600, dated Jan. 23, 2017.
Non-Final Office Action for U.S. Appl. No. 14/919,337, dated Jan. 4, 2017.
Notice of Allowance for U.S. Appl. No. 14/710,491, dated Oct. 24, 2016.
PUBCHEM Open Chemistry Database, Compound Summary for CID 91001799. Mar. 17, 2015. pp. 1-10.
International Search Reprot and Written Opinion for International Application No. PCT/US2016/039395, dated Oct. 20, 2016.
International Search Report and Written Opinion for International Application No. PCT/US2016/039395, dated Jul. 1, 2016.
Final Office Action for U.S. Appl. No. 14/919,337, dated May 1, 2017.
International Search Report and Written Opinion for International Application No. PCT/US2017/017146, dated May 11, 2017.
Non-Final Office Action for U.S. Appl. No. 15/053,943, dated Apr. 19, 2017.
Center for Dielectric Studies, Janosik, et al., "Ultra-High Energy Density Capacitors Through Improved Glass Technology", pp. 1-5 Center for Dielectric Studies Penn State University, dated 2004.
Congressional Research Service, Paul W. Parfomak, "Energy Storage for Power Grids and Electric Transportation: A Technology Assessment", pp. 87-94; Members and Committees of Congress; Mar. 27, 2012.
Department of Chemistry and Biochemistry, Hardy, et al. "Converting an Electrical Insulator into a Dielectric Capacitor: End-Capping Polystyrene with Oligoaniline"; pp. 799-807, Rensselaer Polytechnic Institute, Troy, New York 12180; Feb. 17, 2013.
Department of Chemistry, Ho et al., "High dielectric constant polyanilinelpoly(acrylic acid) composites prepared by in situ polymerization", pp. 630-637; National Taiwan University, Taipei, Taiwan, ROC, Apr. 15, 2008.
Hindawi Publishing Corporation, Chávez-Castillo et al, "Third-Order Nonlinear Optical Behavior of Novel Polythiophene Derivatives Functionalized with Disperse Red 19 Chromophore", pp. 1-11, International Journal of Polymer Science vol. 2015, Article ID 219361, Mar. 12, 2015.
Hindawi Publishing Corporation, González-Espasandin et al., "Fuel Cells: A Real Option for Unmanned Aerial Vehicles Propulsion", pp. 1-13, Torrefon de Ardoz, 28850 Madrid, Spain Jan. 30, 2014.
Hindawi Publishing Corporation, Khalil Ahmed et al., "High dielectric constant polyaniline/poly(acrylic acid) composites prepared by in situ polymerization", pp. 630-637, University of the Punjab, New Campus, Lahore 54590, Oct. 17, 2015.
Institute of Transportation Studies, Burke, et al. "Review of the Present and Future Applications of Supercapacitors in Electric and Hybrid Vehicles", pp. 2-23 UC Davis ITS; Dec. 2014.
International Search Report and Written Opinion for International Application No. PCT/US2015/058890, dated Feb. 25, 2016.
International Search Report and Written Opinion for International Application No. PCT/US2015/030356, dated Jul. 28, 2015.
International Search Report and Written Opinion for International Application No. PCT/US2015/030415, dated Nov. 4, 2015.
International Union of Pure and Applied Chemistry Polymer Divison Stejskal et al., "Polyaniline: Thin Films and Colloidal Dispersions (IUPAC Technical Report)", vol. 77, No. 5, pp. 815-826, Russian Academy of Sciences, St. Petersburg 199004, Russia; 2005.
JACS Articles, Kang et. al., "Ultralarge Hyperpolarizability Twisted π-Electron System Electro-Optic Chromophores: Synthesis, Solid-State and Solution-Phase Structural Characteristics, Electronic Structures, Linear and Nonlinear Optical Properties, and Computational Studies", pp. 3267-3286; Perugia, Italy Feb. 20, 2007.
Yue Wang, et. al., "Morphological and Dimensional Control via Hierarchical Assembly of Doped Oligoaniline Single Crystals", J. Am. Chem. Soc. 2012, 134, pp. 9251-9262.
Microelectronics Research and Communications Institute, Founders et al., "High-Voltage Switching Circuit for Manometer Scale CMOS Technologies", pp. 1-4, University of Idaho, Moscow, ID 83843 USA, Apr. 30, 2007.
Molecular Diversity Preservation International, Barber, et al. "Polymer Composite and Nanocomposite Dielectric Materials for Pulse Power Energy Storage" pp. 1-32; 29 University of South Carolina, Columbia, SC 29208 Oct. 2009.
Optical Society of America, Kuzyk et al, "Theory of Molecular Nonlinear Optics", pp. 5, 4-82, Department of Physics and Astronomy, Washington State University, Pullman, Washington 99164-2814, USA, Mar. 26, 2013.
Philosophical Transactions of the Royal Society, Simon, "Charge storage mechanism in nanoporous carbons and its consequence for electrical double layer capacitors" pp. 3457-3467; Drexel University, Philadelphia, PA 19104, 2010.
R. J. Baker and B. P. Johnson, "stacking power MOSFETs for use in high speed instrumentation", Department of Electrical Engineering, University of Nevada, Reno, Reno. Nevada 89557-0030; pp. 5799-5801 Aug. 3, 1992.
RSC Publishing, Akl et al., "Molecular materials for switchable nonlinear optics in the solid state, based on ruthenium-nitrosyl complexes", pp. 3518-3527, Porto Alegre, Brazil; May 24, 2013.
U.S. Appl. No. 15/053,943, to Pavel Ivan Lazarev, et al., filed Mar. 14, 2016.
U.S. Appl. No. 15/090,509, to Pavel Ivan Lazarev, et al., filed Mar. 4, 2016.
U.S. Appl. No. 14/752,600, to Matthew R. Robinson, et al., filed Jun. 26, 2015.
U.S. Appl. No. 14/919,337, to Paul T. Furuta, et al., filed Oct. 21, 2015.
U.S. Appl. No. 14/931,757, to Pavel Ivan Lazarev, et al., filed Nov. 3, 2015.
U.S. Appl. No. 15/043,186, to Paul T. Furuta, et al., filed Feb. 12, 2016.
U.S. Appl. No. 15/043,209, to Paul T. Furuta, et al., filed Feb. 12, 2016.
U.S. Appl. No. 15/043,247, to Barry K Sharp, et al., filed Feb. 12, 2016.
U.S. Appl. No. 14/719,072, to Pavel Ivan Lazarev, filed May 21, 2015.

(56) References Cited

OTHER PUBLICATIONS

U.S. Appl. No. 15/043,315, to Ivan S.G. Kelley-Morgan, filed Feb. 12, 2016.
U.S. Appl. No. 62/318,134, to Pavel Ivan Lazarev, et al., filed Mar. 4, 2016.
U.S. Appl. No. 62/294,964, to Pavel Ivan Lazarev, et al., filed Feb. 12, 2016.
U.S. Appl. No. 62/121,328, to Pavel Ivan Lazarev et al., filed Feb. 26, 2015.
U.S. Appl. No. 62/294,949, to Pavel Ivan Lazarev, et al., filed Feb. 12, 2016.
U.S. Appl. No. 62/294,955, to Pavel Ivan Lazarev, et al., filed Feb. 12, 2016.
Deily, Dielectric and Optical Characterization of Polar Polymeric Materials: Chromophore Entrained PMMA Thin Films, Thesis, 2008.
Deruiter, J. Resonance and Induction Tutorial. Auburn University-Principles of Drug Action 1 Course Material. Spring 2005, 19 pages.
Handy, Scott T. "Ionic Liquids-Classes and Properties" Published Sep. 2011, Accessed Aug. 28, 2017, InTechweb.org.
International Search Report and Written Opinion for International Application No. PCT/US2016/57765 dated Jan. 5, 2017.
International Search Report and Written Opinion for International Application No. PCT/US2017/017150, dated May 18, 2017.
International Search Report and Written Opinion for International Application No. PCT/US2017/24150, dated Jun. 21, 2017.
International Search Report and Written Opinion for International Application No. PCT/US2017/24371, dated Aug. 2, 2017.
Isoda, Kyosuke et al. "Truxene-Based Columnar Liquid Crystals: Self-Assembled Structures and Electro-Active Properties." Chemistry—An Asian Journal (2009), vol. 4, No. 10, pp. 1619-1625.
Johnson, Kieth E. "What's an Ionic Liquid?" The Electrochemical Society Interface, Published Spring 2007, pp. 38-41, Accessed Aug. 28, 2017.
Li, Li-Li et al. "Synthesis and Mesomorphism of Ether-ester Mixed Tail C3-symmetrical Truxene discotic liquid crystals." Liquid Crystals(2010), vol. 37, No. 5, pp. 499-506.
Liang, Mao et al. "Synthesis and Photovoltaic Performance of Two Triarylamine Organic Dyes Based on Truxene." Yinyong Huaxue (2011) vol. 28 No. 12, pp. 1387-1392.
Lu, Meng et al. "Organic Dyes Incorporating Bishexapropyltruxeneamino Moiety for efficient Dye-sensitized Solar Cells." Journal of Physical Chemistry C (2011) vol. 115, No. 1, pp. 274-281.
Maddalena, Francesco "Why are Ionic Liquids, Liquids?" http://www.quora.com/why-are-ionic-liquids-liquids?, Published Jan. 26, 2017, Accessed Aug. 28, 2017.
Manukian, BK. 216. IR.-spektroskopische Untersuchungen in der Imidazol-Reihe. Helvetica Chimica Acta. 1965, vol. 48, p. 2001.
Ni, Hai-Lang et al. "Truxene Discotic Liquid Crystals with Two Different Ring Substituents: Synthesis, Metamorphosis and High Charged Carrier Mobility." Liquid Crystals, vol. 40, No. 3, pp. 411-420.
Non-Final Office Action dated Jun. 13, 2017 for U.S. Appl. No. 15/163,595.
Non-Final Office Action for U.S. Appl. No. 14/719,072, dated Aug. 2, 2017.
Non-Final Office Action for U.S. Appl. No. 15/043,247, dated Jun. 22, 2017.
Non-Final Office Action for U.S. Appl. No. 14/710,480, dated May 8, 2017.
Non-Final Office Action for U.S. Appl. No. 15/043,186, dated Jun. 2, 2017.
Notice of Allowance for U.S. Appl. No. 14/710,491, dated Jan. 19, 2017.
Notice of Allowance for U.S. Appl. No. 14/752,600, dated Jul. 27, 2017.
Notice of Allowance for U.S. Appl. No. 14/919,337, dated Jul. 19, 2017.
Notice of Allowance of U.S. Appl. No. 14/931,757, dated Jul. 17, 2017.
Notice of Allowance for U.S. Appl. No. 15/053,943, dated Aug. 14, 2017.
Trevethan, Thomas et al. "Organic Molecules Reconstruct Nanostructures on Ionic Surfaces." Small (2011), vol. 7, No. 9, pp. 1264-1270.
Warmerdam, T. W. et al. "Discotic Liquid Crystals. Physical Parameters of some 2, 3, 7, 8, 12, 13-hexa(alkanoyloxy) truxenes: Observation of a Reentrant Isotropic Phase in a Pure Disk-like mesogen." Liquid Crystals (1988), vol. 3, No. 8, pp. 1087-1104.
International Search Report and Written Opinion for International Application No. PCT/US2017/016862, dated Aug. 14, 2017.
International Search Report and Written Opinion for International Application No. PCT/US2017/24600, dated Aug. 14, 2017.
Nagabrahmandachari et al. "Synthesis and Spectral Analysis of Tin Tetracarboxylates and Phosphinates" Indian Journal of Chemistry-Section A, 1995, vol. 34A, pp. 658-660.
Non-Final Office Action for U.S. Appl. No. 15/194,224, dated Sep. 27, 2017.
Notice of Allowance for U.S. Appl. No. 14/710,480, dated Oct. 6, 2017.
Final Office Action for U.S. Appl. No. 15/043,247, dated Oct. 4, 2017.
Extended European Search Report for Application No. 15792405.1, dated Nov. 10, 2017.
Hsing-Yang Tsai et al, "1,6- and 1,7-Regioisomers of Asymmetric and Symmetric Perylene Bisimides: Synthesis, Characterization and Optical Properties" Molecules, 2014, vol. 19, pp. 327-341.
Hsing-Yang Tsai et al, "Synthesis and optical properties of novel asymmetric perylene bisimides", Journal of Luminescence, vol. 149, pp. 103-111 (2014).
Notice of Allowance for U.S. Appl. No. 14/919,337, dated Nov. 8, 2017.
Notice of Allowance for U.S. Appl. No. 14/710,480, dated Nov. 24, 2017.
Office Action dated Oct. 19, 2017 for Taiwan patent Application No. 106104501.
Notice of Allowance for U.S. Appl. No. 14/719,072, dated Nov. 16, 2017.
Non-Final Office Action for U.S. Appl. No. 15/043,315, dated Dec. 26 2017.
Office Action dated Dec. 13, 2017 for Taiwan Patent Application No. 106104499.
Office Action dated Dec. 13, 2017 for Taiwan Patent Application No. 106104500.
Notice of Allowance for U.S. Appl. No. 14/710,480, dated Jan. 11, 2018.
Non-Final Office Action for U.S. Appl. No. 15/163,595, dated Jan. 17, 2018.
Notice of Allowance for U.S. Appl. No. 15/090,509, dated Jan. 24, 2018.

* cited by examiner

ENERGY STORAGE DEVICES AND METHODS OF PRODUCTION THEREOF

BACKGROUND

A capacitor is a passive electronic component that is used to store energy in the form of an electrostatic field, and comprises a pair of electrodes separated by a dielectric layer. When a potential difference exists between two electrodes, an electric field is present in the dielectric layer. This field stores energy and an ideal capacitor is characterized by a single constant value of capacitance which is a ratio of the electric charge on each electrode to the potential difference between them. In practice, the dielectric layer between electrodes passes a small amount of leakage current. Electrodes and leads introduce an equivalent series resistance, and dielectric layer has limitation to an electric field strength which results in a breakdown voltage. The simplest capacitor consists of two parallel electrodes separated by a dielectric layer of permittivity $\in$, each of the electrodes has an area S and is placed on a distance d from each other. Electrodes are considered to extend uniformly over an area S, and a surface charge density can be expressed by the equation: $\pm\rho=\pm Q/S$. As the width of the electrodes is much greater than the separation (distance) d, an electrical field near the centre of the capacitor will be uniform with the magnitude $E=\rho/\in$. Voltage is defined as a line integral of the electric field between electrodes. An ideal capacitor is characterized by a constant capacitance C defined by the formula (1)

$$C=Q/V, \qquad (1)$$

which shows that capacitance increases with area and decreases with distance. Therefore the capacitance is largest in devices made of materials of high permittivity.

A characteristic electric field known as the breakdown strength $E_{bd}$, is an electric field in which the dielectric layer in a capacitor becomes conductive. Voltage at which this occurs is called the breakdown voltage of the device, and is given by the product of dielectric strength and separation between the electrodes, $$V_{bd}=E_{bd}d \qquad (2)$$

The maximal volumetric energy density stored in the capacitor is limited by the value proportional to $\sim\in\cdot E^2_{bd}$, where $\in$ is dielectric permittivity and $E_{bd}$ is breakdown strength. Thus, in order to increase the stored energy of the capacitor it is necessary to increase dielectric permeability $\in$ and breakdown strength $E_{bd}$ of the dielectric.

For high voltage applications much larger capacitors have to be used. There are a number of factors that can dramatically reduce the breakdown voltage. Geometry of the conductive electrodes is important for these applications. In particular, sharp edges or points hugely increase the electric field strength locally and can lead to a local breakdown. Once a local breakdown starts at any point, the breakdown will quickly "trace" through the dielectric layer till it reaches the opposite electrode and causes a short circuit.

Breakdown of the dielectric layer usually occurs as follows. Intensity of an electric field becomes high enough free electrons from atoms of the dielectric material and make them conduct an electric current from one electrode to another. Presence of impurities in the dielectric or imperfections of the crystal structure can result in an avalanche breakdown as observed in semiconductor devices.

Other important characteristic of a dielectric material is its dielectric permittivity. Different types of dielectric materials are used for capacitors and include ceramics, polymer film, paper, and electrolytic capacitors of different kinds. The most widely used polymer film materials are polypropylene and polyester. Increase of dielectric permittivity allows increasing of volumetric energy density which makes it an important technical task.

An ultra-high dielectric constant composite of polyaniline, PANI-DBSA/PAA, was synthesized using in situ polymerization of aniline in an aqueous dispersion of polyacrylic acid (PAA) in the presence of dodecylbenzene sulfonate (DBSA) (see, Chao-Hsien Hoa et al., "High dielectric constant polyaniline/poly(acrylic acid) composites prepared by in situ polymerization", Synthetic Metals 158 (2008), pp. 630-637). The water-soluble PAA served as a polymeric stabilizer, protecting the PANI particles from macroscopic aggregation. A very high dielectric constant of ca. $2.0*10^5$ (at 1 kHz) was obtained for the composite containing 30% PANI by weight. Influence of the PANI content on the morphological, dielectric and electrical properties of the composites was investigated. Frequency dependence of dielectric permittivity, dielectric loss, loss tangent and electric modulus were analyzed in the frequency range from 0.5 kHz to 10 MHz. SEM micrograph revealed that composites with high PANI content (i.e., 20 wt. %) consisted of numerous nano-scale PANI particles that were evenly distributed within the PAA matrix. High dielectric constants were attributed to the sum of the small capacitors of the PANI particles. The drawback of this material is a possible occurrence of percolation and formation of at least one continuous conductive path under electric field with probability of such an event increasing with an increase of the electric field. When at least one continuous path (track) through the neighboring conducting PANI particles is formed between electrodes of the capacitor, it decreases a breakdown voltage of such capacitor.

Colloidal polyaniline particles stabilized with a water-soluble polymer, poly(N-vinylpyrrolidone) [poly(1-vinylpyrrolidin-2-one)], have been prepared by dispersion polymerization. The average particle size, 241±50 nm, have been determined by dynamic light scattering (see, Jaroslav Stejskal and Irina Sapurina, "Polyaniline: Thin Films and Colloidal Dispersions (IUPAC Technical Report)", Pure and Applied Chemistry, Vol. 77, No. 5, pp. 815-826 (2005).

Single crystals of doped aniline oligomers are produced via a simple solution-based self-assembly method (see, Yue Wang, et. al., "Morphological and Dimensional Control via Hierarchical Assembly of Doped Oligoaniline Single Crystals", J. Am. Chem. Soc. 2012, 134, pp. 9251-9262). Detailed mechanistic studies reveal that crystals of different morphologies and dimensions can be produced by a "bottom-up" hierarchical assembly where structures such as one-dimensional (1-D) nanofibers can be aggregated into higher order architectures. A large variety of crystalline nanostructures, including 1-D nanofibers and nanowires, 2-D nanoribbons and nanosheets, 3-D nanoplates, stacked sheets, nanoflowers, porous networks, hollow spheres, and twisted coils, can be obtained by controlling the nucleation of the crystals and the non-covalent interactions between the doped oligomers. These nanoscale crystals exhibit enhanced conductivity compared to their bulk counterparts as well as interesting structure-property relationships such as shape-dependent crystallinity. Furthermore, the morphology and dimension of these structures can be largely rationalized and predicted by monitoring molecule-solvent interactions via absorption studies. Using doped tetra-aniline as a model system, the results and strategies presented in this article provide insight into the general scheme of shape and size control for organic materials.

There is a known energy storage device (capacitor) based on a multilayer structure. The energy storage device includes first and second electrodes, and a multilayer structure comprising blocking and dielectric layers. The first blocking layer is disposed between the first electrode and a dielectric layer, and the second blocking layer is disposed between the second electrode and a dielectric layer. Dielectric constants of the first and second blocking layers are both independently greater than the dielectric constant of the dielectric layer. A drawback of this device is that blocking layers of high dielectric permittivity located directly in contact with electrodes can lead to destruction of the energy storage device. Materials with high dielectric permittivity which are based on composite materials and containing polarized particles (such as PANI particles) may demonstrate a percolation phenomenon. The formed polycrystalline structure of layers has multiple tangling chemical bonds on borders between crystallites. When the used material with high dielectric permittivity possesses polycrystalline structure, a percolation may occur along the borders of crystal grains. Another drawback of the known device is an expensive manufacturing procedure which is vacuum deposition of all layers.

Capacitors as energy storage device have well-known advantages versus electrochemical energy storage, e.g. a battery. Compared to batteries, capacitors are able to store energy with very high power density, i.e. charge/recharge rates, have long shelf life with little degradation, and can be charged and discharged (cycled) hundreds of thousands or millions of times. However, capacitors often do not store energy in small volume or weight as in case of a battery, or at low energy storage cost, which makes capacitors impractical for some applications, for example electric vehicles. Accordingly, it may be an advance in energy storage technology to provide capacitors of higher volumetric and mass energy storage density and lower cost.

SUMMARY

The present disclosure provides energy storage devices (e.g., capacitors) and methods of production thereof. Energy storage devices of the present disclosure may solve a problem of the further increase of volumetric and mass density of reserved energy associated with some energy storage devices, and at the same time reduce cost of materials and manufacturing process.

In an aspect, a capacitor comprises a first electrode, a second electrode, and a solid multilayer structure disposed between said first and second electrodes. Said electrodes are planar and positioned parallel to each other, and said solid multilayer structure comprises layers disposed parallel to said electrodes and has following sequence: $(A-B)_m$-A, where A is an insulating layer; B is a polarization layer comprising a micro-dispersion of electro-conductive nanoparticles in an insulator matrix, and number m≥1. In some situations, m can be greater than or equal to 1, 2, 3, 4, 5, 6, 7, 8, 9, 10, 20, 30, 40, 50, 100, 200, 300, 400, 500, or 1000. In some examples, m is from 1 to 1000, 1 to 100, or 1 to 50. The electrodes can be nearly or substantially parallel to each other. The electrodes can be off-set from a parallel configuration.

In another aspect, a method of producing a capacitor comprises (a) preparation of a conducting substrate serving as one of the electrodes, (b) formation of a solid multilayer structure, and (c) formation of the second electrode on the multilayer structure, wherein formation of the multilayer structure comprises alternating steps of the application of insulating and polarization layers or a step of coextrusion of the layers.

In another aspect, a method of producing a capacitor comprises coating of insulating layers on both electrodes, and coating of a multilayer structure on one of electrodes with lamination of second electrode to multilayer structure.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
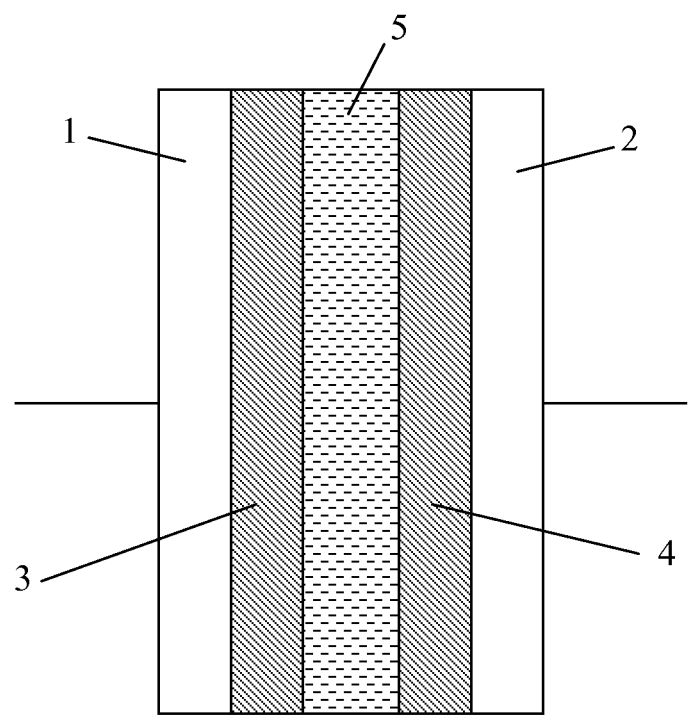
FIG. 1 schematically shows an energy storage device, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides energy storage devices, such as capacitors. In one embodiment of the present invention, the insulating layers are crystalline. The insulating layers can be fabricated from any suitable crystalline material including a single crystal material, a batch crystal material, or amorphous material. Depending on the application, dielectric permittivity of the insulating dielectric material $\varepsilon_{ins}$ may be in the broad range. The insulating layer comprises a material characterized by a band gap of greater than 4 eV and by breakdown field strength of greater than about 0.001 volts (V)/nanometer (nm), 0.01 V/nm, 0.05 V/nm, 0.1 V/nm, 0.2 V/nm, 0.3 V/nm, 0.4 V/nm, 0.5 V/nm, 1 V/nm, or 10 V/nm. The material of the polarization layers possesses dielectric permittivity $\varepsilon_{pol}$ which may be in the broad range. In some cases, $\varepsilon_{pol}$ is at least about 100, 200, 300, 400, 500, 1000, 2000, 3000, 4000, 5000, 6000, 7000, 8000, 9000, 10,000, or 100,000.

For the present invention the solid insulating dielectric layers may possess a different structure in the range between an amorphous and crystalline solid layer, depending on the material and manufacturing procedure used. In one embodiment of the disclosed capacitor, the insulating layers comprise a material selected from oxides, nitrides, oxynitrides and fluorides. In another embodiment of the disclosed capacitor, the insulating layers comprise a material selected from $SiO_2$, $HfO_2$, $Al_2O_3$ or $Si_3N_4$. In one embodiment of the disclosed capacitor, the insulating layers comprise modified organic compounds of the general structural formula I: {Cor}(M)$_n$, (I) where Cor is a polycyclic organic compound with conjugated π-system, M are modifying functional groups; and n is the number of the modifying functional groups, where n is equal or more than 1. In another embodiment of the present invention, the polycyclic organic compound is selected from the list comprising oligophenyl, imidazole, pyrazole, acenaphthene, triaizine, indanthrone and having a general structural formula selected from structures 1-43 as given in Table 1.

TABLE 1

Examples of the polycyclic organic compound for the insulating layers

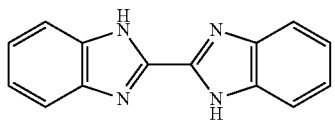

1

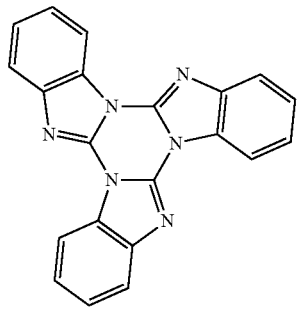 [SMILES: c1ccc2c(c1)nc1n2c2nc3ccccc3n2c2nc3ccccc3n12]

2

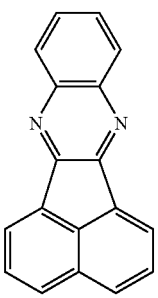 [SMILES: c1cc2c3c(cccc3c1)-c1nc3ccccc3nc1-2]

3

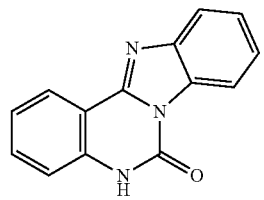 [SMILES: O=c1[nH]c2ccccc2c2nc3ccccc3n12]

4

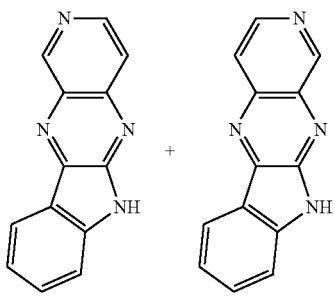 [SMILES: c1ccc2c(c1)[nH]c1nc3ccncc3nc12 ; c1ccc2c(c1)[nH]c1nc3cnccc3nc12]

5

TABLE 1-continued
Examples of the polycyclic organic compound for the insulating layers
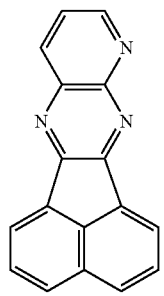 [SMILES: c1cc2c3c(cccc3c1)-c1nc3ncccc3nc1-2]
6
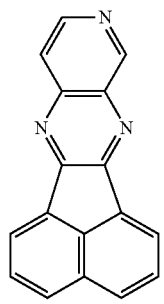 [SMILES: c1cc2c3c(cccc3c1)-c1nc3cnccc3nc1-2]
7
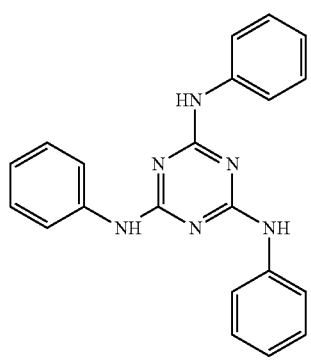 [SMILES: c1ccc(Nc2nc(Nc3ccccc3)nc(Nc3ccccc3)n2)cc1]
8
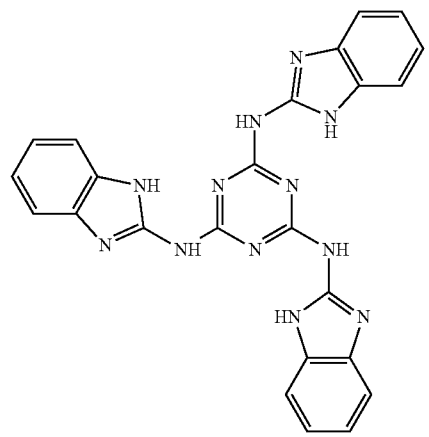 [SMILES: c1ccc2[nH]c(Nc3nc(Nc4nc5ccccc5[nH]4)nc(Nc4nc5ccccc5[nH]4)n3)nc2c1]
9
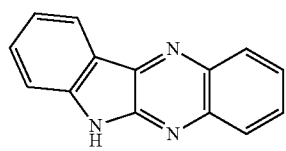 [SMILES: c1ccc2nc3c(nc2c1)[nH]c1ccccc13]
10

TABLE 1-continued
Examples of the polycyclic organic compound for the insulating layers
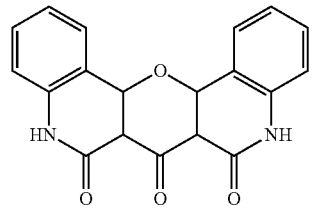 [SMILES: O=C1Nc2ccccc2C2OC3c4ccccc4NC(=O)C3C(=O)C12]
11
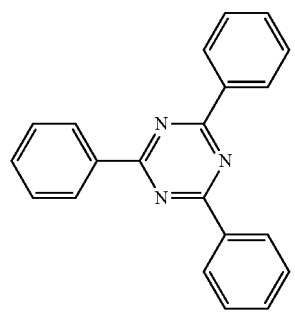 [SMILES: c1ccc(-c2nc(-c3ccccc3)nc(-c3ccccc3)n2)cc1]
12
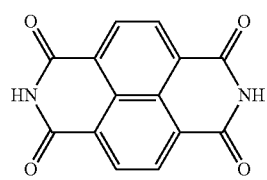 [SMILES: O=C1NC(=O)c2ccc3c4c(ccc1c24)C(=O)NC3=O]
13
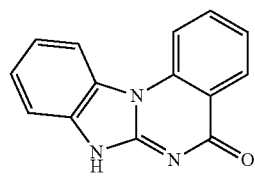 [SMILES: O=c1nc2[nH]c3ccccc3n2c2ccccc12]
14
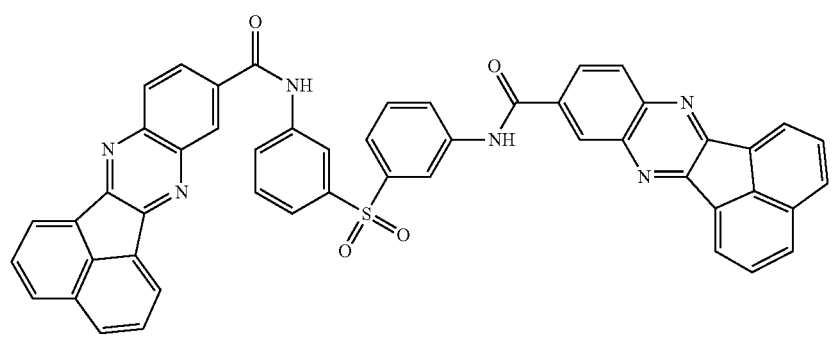 [SMILES: O=C(Nc1cccc(S(=O)(=O)c2cccc(NC(=O)c3ccc4nc5c(nc4c3)-c3cccc4cccc-5c34)c2)c1)c1ccc2nc3c(nc2c1)-c1cccc2cccc-3c12]
15
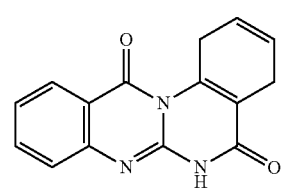 [SMILES: O=c1[nH]c2nc3ccccc3c(=O)n2c2c1CC=CC2]
16

TABLE 1-continued
Examples of the polycyclic organic compound for the insulating layers
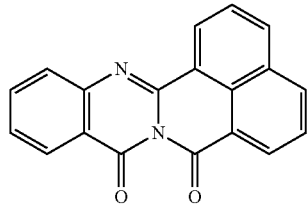 [SMILES: O=c1c2ccccc2nc2c3cccc4cccc(c(=O)n12)c43]
17
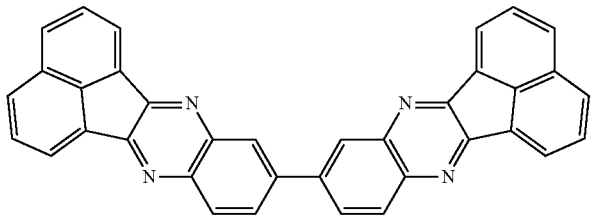 [SMILES: c1cc2c3c(cccc3c1)-c1nc3cc(-c4ccc5nc6c(nc5c4)-c4cccc5cccc-6c45)ccc3nc1-2]
18
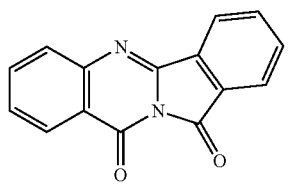 [SMILES: O=C1c2ccccc2-c2nc3ccccc3c(=O)n21]
19
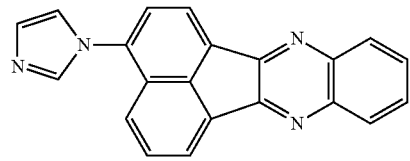 [SMILES: c1ccc2nc3c(nc2c1)-c1cccc2c(-n4ccnc4)ccc-3c12]
20
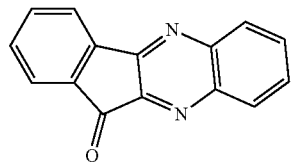 [SMILES: O=C1c2ccccc2-c2nc3ccccc3nc21]
21
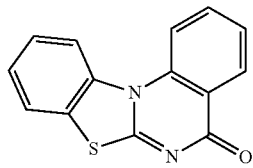 [SMILES: O=c1nc2sc3ccccc3n2c2ccccc12]
22
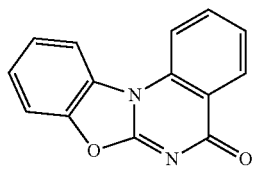 [SMILES: O=c1nc2oc3ccccc3n2c2ccccc12]
23
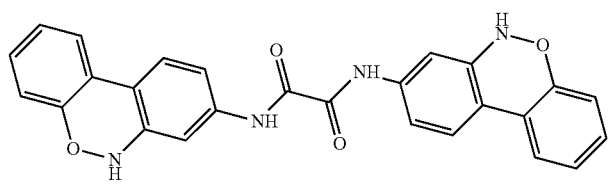 [SMILES: O=C(Nc1ccc2c(c1)NOc1ccccc1-2)C(=O)Nc1ccc2c(c1)NOc1ccccc1-2]
24

TABLE 1-continued
Examples of the polycyclic organic compound for the insulating layers
25 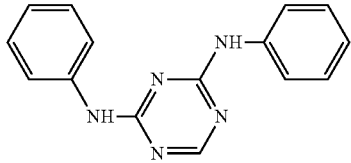 [SMILES: c1ccc(Nc2ncnc(Nc3ccccc3)n2)cc1]
26 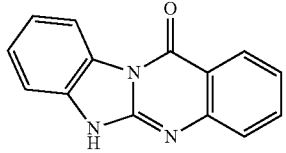 [SMILES: O=c1c2ccccc2nc2[nH]c3ccccc3n12]
27 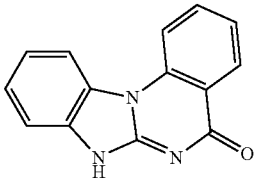 [SMILES: O=c1nc2[nH]c3ccccc3n2c2ccccc12]
28 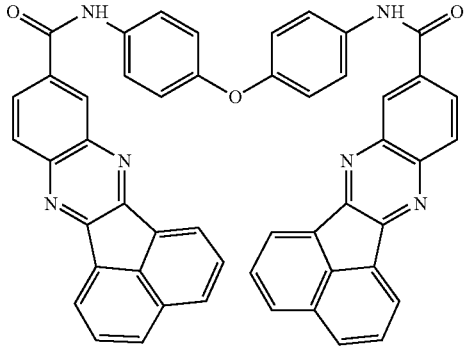 [SMILES: O=C(Nc1ccc(Oc2ccc(NC(=O)c3ccc4nc5c(nc4c3)-c3cccc4cccc-5c34)cc2)cc1)c1ccc2nc3c(nc2c1)-c1cccc2cccc-3c12]
29 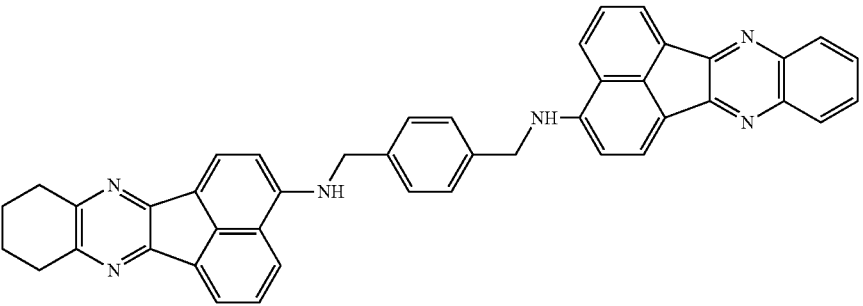 [SMILES: c1ccc2nc3c(nc2c1)-c1cccc2c(NCc4ccc(CNc5ccc6c7c(cccc57)-c5nc7c(nc5-6)CCCC7)cc4)ccc-3c12]
30 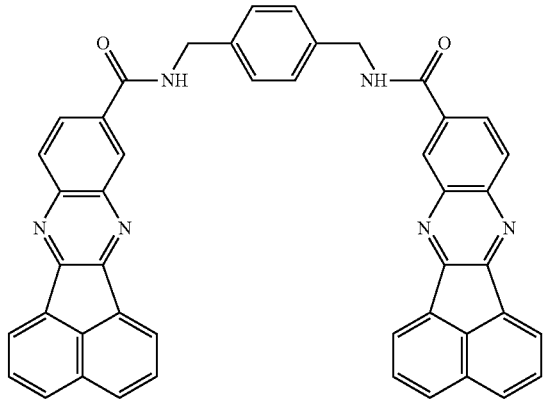 [SMILES: O=C(NCc1ccc(CNC(=O)c2ccc3nc4c(nc3c2)-c2cccc3cccc-4c23)cc1)c1ccc2nc3c(nc2c1)-c1cccc2cccc-3c12]

TABLE 1-continued
Examples of the polycyclic organic compound for the insulating layers
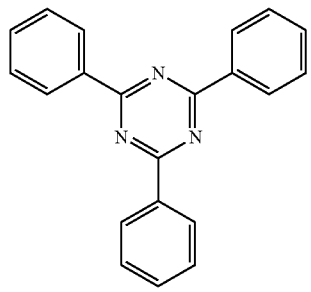 [SMILES: c1ccc(-c2nc(-c3ccccc3)nc(-c3ccccc3)n2)cc1]
31
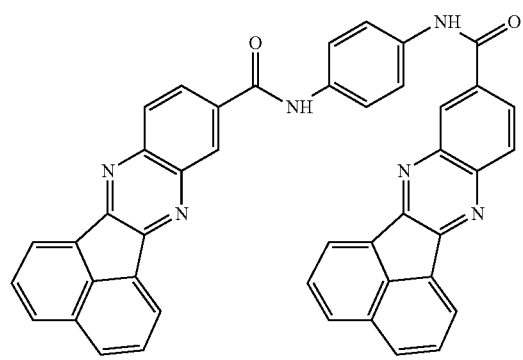 [SMILES: O=C(Nc1ccc(NC(=O)c2ccc3nc4c(nc3c2)-c2cccc3cccc-4c23)cc1)c1ccc2nc3c(nc2c1)-c1cccc2cccc-3c12]
32
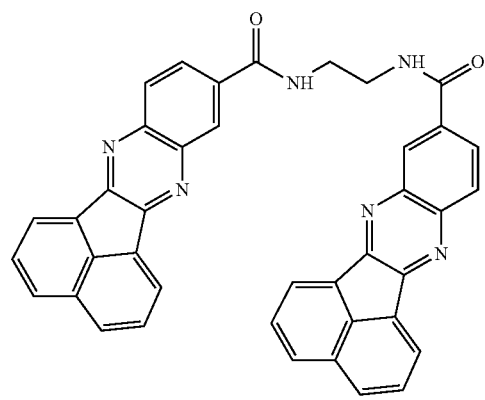 [SMILES: O=C(NCCNC(=O)c1ccc2nc3c(nc2c1)-c1cccc2cccc-3c12)c1ccc2nc3c(nc2c1)-c1cccc2cccc-3c12]
33
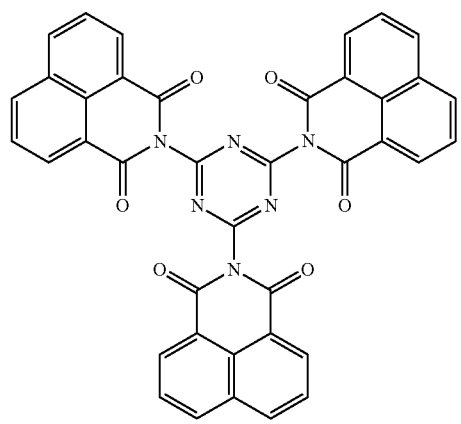 [SMILES: O=C1c2cccc3cccc(c23)C(=O)N1c1nc(N2C(=O)c3cccc4cccc(c34)C2=O)nc(N2C(=O)c3cccc4cccc(c34)C2=O)n1]
34

TABLE 1-continued
Examples of the polycyclic organic compound for the insulating layers
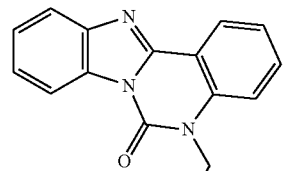  35
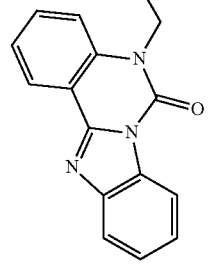  36
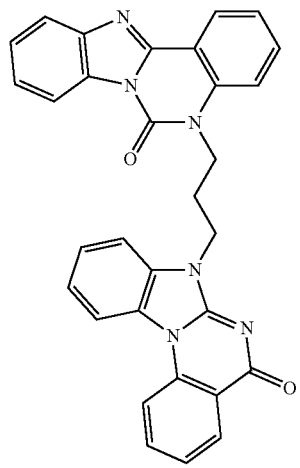 [SMILES: O=c1nc2n(CCCn3c(=O)n4c5ccccc5nc4c4ccccc43)c3ccccc3n2c2ccccc12]  37
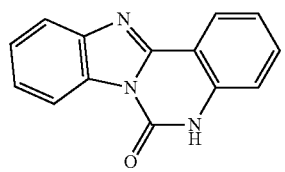 [SMILES: O=c1[nH]c2ccccc2c2nc3ccccc3n12]  38
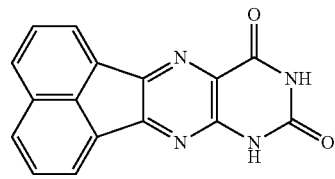 [SMILES: O=c1[nH]c(=O)c2nc3c(nc2[nH]1)-c1cccc2cccc-3c12]  39
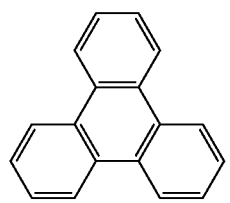 [SMILES: c1ccc2c(c1)c1ccccc1c1ccccc21]

TABLE 1-continued

Examples of the polycyclic organic compound for the insulating layers

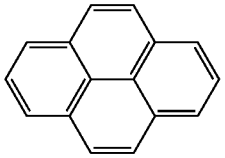 [SMILES: c1cc2ccc3cccc4ccc(c1)c2c34]
40

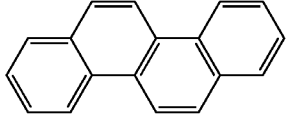 [SMILES: c1ccc2c(c1)ccc1c3ccccc3ccc21]
41

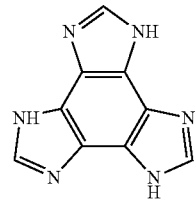 [SMILES: c1nc2c([nH]1)c1nc[nH]c1c1nc[nH]c21]
41

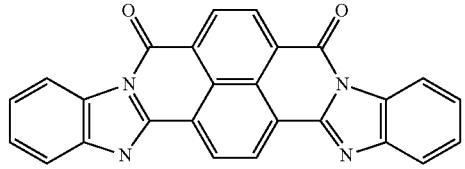
42

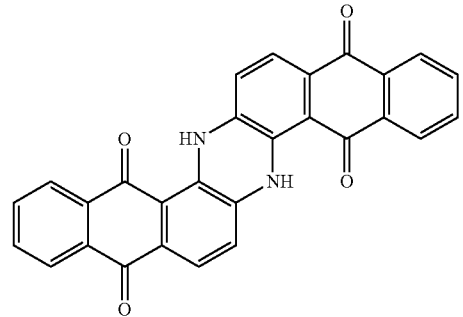 [SMILES: O=c1c2ccccc2c(=O)c2c1ccc1[nH]c3c(ccc4c(=O)c5ccccc5c(=O)c43)[nH]c12]
43

In another embodiment of the present invention, the modifying functional groups are selected from the list comprising alkyl, aryl, substituted alkyl, substituted aryl, and any combination thereof. The modifying functional groups provide solubility of organic compounds at the stage of manufacturing and additional insulating properties to the solid insulating layer of the capacitor. In yet another embodiment of the present invention, the insulating layers comprise polymeric materials selected from the list comprising fluorinated alkyls, polyethylene, kevlar, poly(vinylidene fluoride-hexafluoropropylene), polypropylene, fluorinated polypropylene, polydimethylsiloxane. In still another embodiment of the present invention, the insulating layers comprise a polymeric material formed on the basis of water-soluble polymers which are selected from the structures 44 to 49 as given in Table 2.

TABLE 2

Examples of the water-soluble polymers for the insulating layers

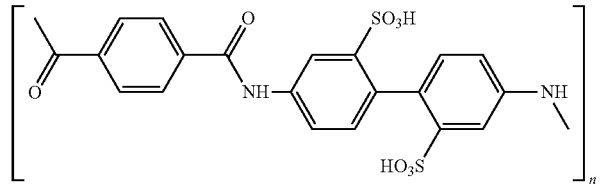
44 poly(2,2'-disulfo-4,4'-benzidine terephthalamide)

TABLE 2-continued

Examples of the water-soluble polymers for the insulating layers

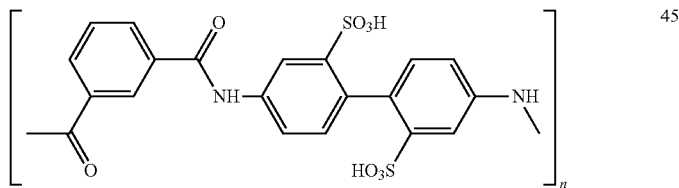

poly(2,2'-disulfo-4,4'-benzidine isophthalamide)

45

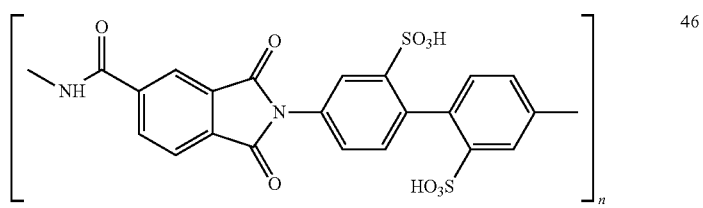

poly(2,2'-disulfo-4,4'-benzidine 1,3-dioxo-isoindoline-5-carboxamide)

46

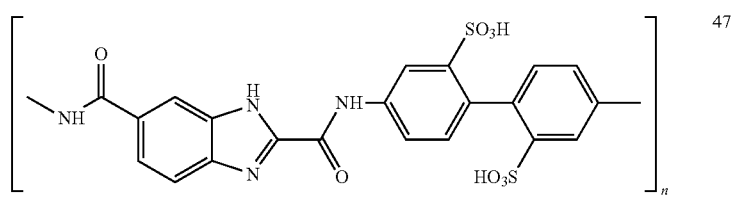

poly(2,2'-disulfo-4,4'-benzidine 1H-benzimidazole-2,5-dicarboxamide)

47

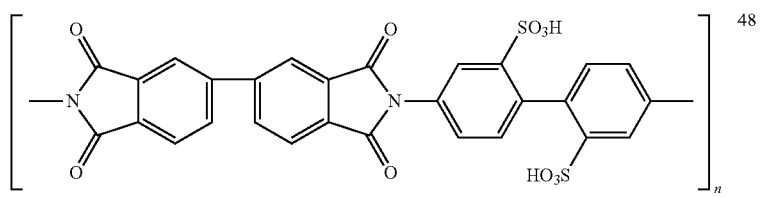

poly(2,2'-disulfo-4,4'-benzidine 3,3',4,4'-biphenyl tetracarboxylic acid diimide)

48

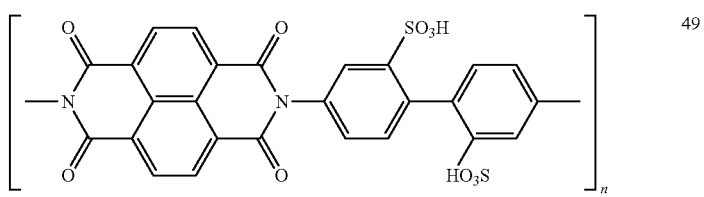

poly(2,2'disulpho-4,4'benzidine 1,4,5,8-naphtalen tetracarboxylic acid diimide)

49

In another embodiment of the present invention, the insulating layers comprise a polymeric material formed on the basis of polymers soluble in organic solvents which are selected from the structures 50 to 55 as given in Table 3.

invention, the polarization layers comprise the nano-particles of electro-conductive oligomers. In another embodiment of the present invention, the longitudinal axes of the electroconductive oligomers are directed predominantly per-

TABLE 3

Examples of the polymers soluble in organic solvents for the insulating layers

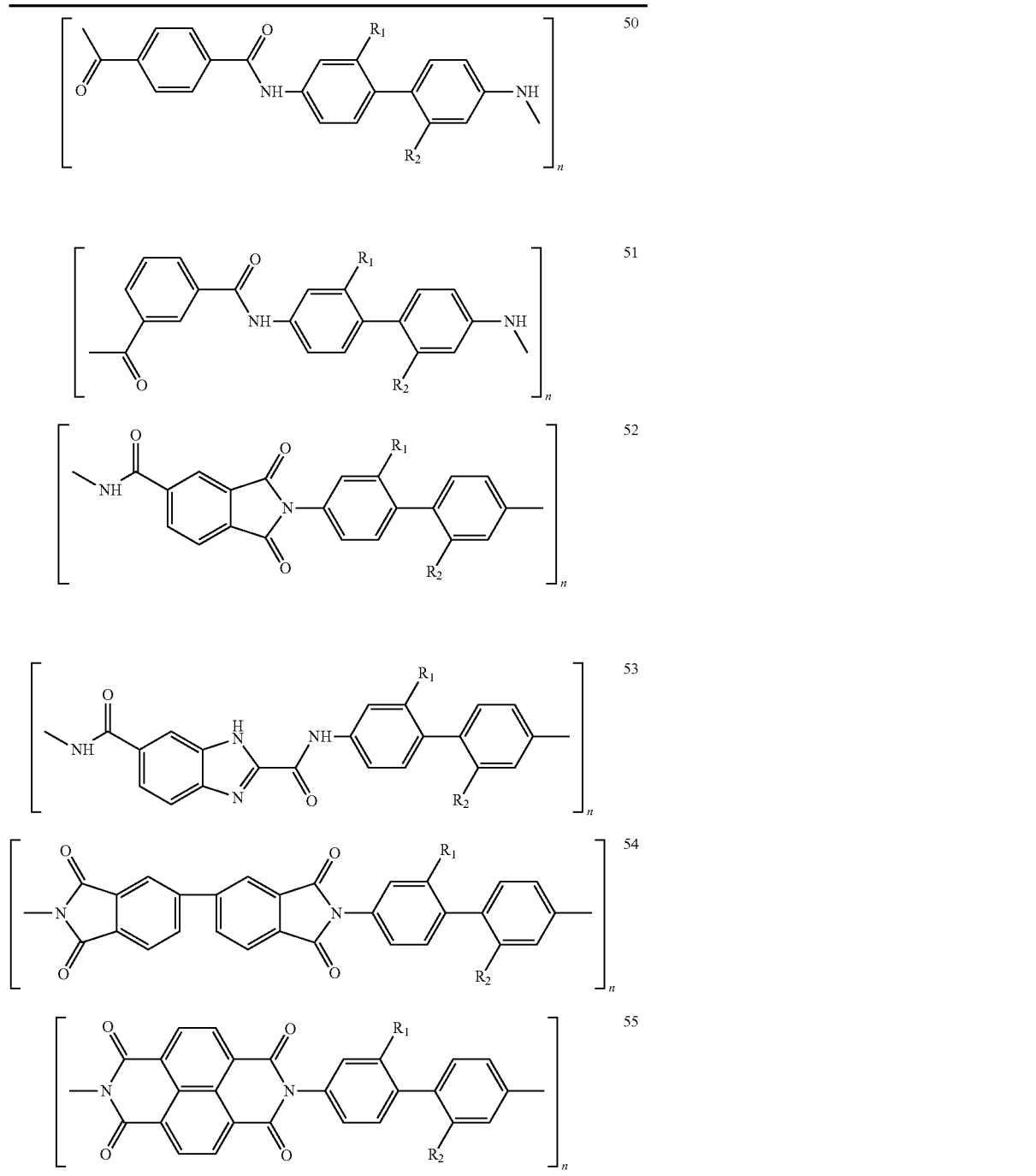

wherein the modifying functional groups $R_1$ and $R_2$ are independently selected from the list comprising alkyl, aryl, substituted alkyl, substituted aryl, and any combination thereof.

In one embodiment of the present invention the polarization layers are crystalline. In one embodiment of the present pendicularly in relation to the electrode surface. In one embodiment of the present invention, the electroconductive oligomers are selected from the list comprising following structural formulas corresponding to one of structures 57 to 63 as given in Table 4.

TABLE 4

Examples of the electroconductive oligomers for the polarization layers

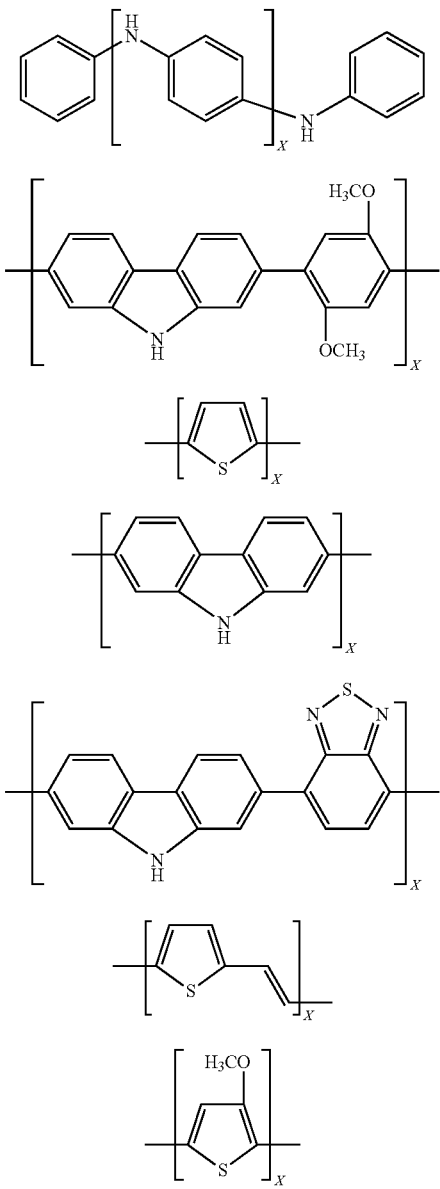

where X=2, 3, 4, 5, 6, 7, 8, 9, 10, 11 and 12. In another embodiment of the capacitor of the present invention, the polarization layers comprise the electro-conductive nano-particles of low-molecular weight electro-conductive polymers. In another embodiment of the present invention, the low-molecular weight electroconductive polymer contains moieties selected from the structures 57 to 63 as given in Table 4. In another embodiment of the disclosed capacitor, the electroconductive oligomers further comprise substitute groups and are described by the following general structural formula II:

(electroconductive oligomer)-$R_q$, (II)

where $R_q$ is a set of substitute groups, and q is a number of the substitute groups R in the set $R_q$, q can be equal to 0, 1, 2, 3, 4, 5, 6, 7, 8, 9 or 10. In yet another embodiment of the capacitor, the substitute groups R are independently selected from the list comprising alkyl, aryl, substituted alkyl, substituted aryl, and any combination thereof. In still another embodiment of the capacitor, a material of the insulator matrix is selected from the list comprising poly (acrylic acid) (PAA), poly(N-vinylpyrrolidone) (PVP), poly(vinylidene fluoride-hexafluoropropylene) [P(VDF-HFP)], ethylene propylene polymers, which include ethylene propylene rubber (EPR) and ethylene propylene diene monomer (EPDM), and silicone rubber (PDMSO) such as dimethyldicloro siloxane, dimethylsilane diol, and polydimethyl siloxane. These compounds serve also as a stabilizer, protecting the electro-conductive nano-particles from macroscopic aggregation. Electrodes of the disclosed energy storage device may be made of any suitable material, including but not limited to Pt, Cu, Al, Ag, Au, Ti, W, Zn, Ni or low melting temperature alloys. In one embodiment of the present invention, the thickness of the insulating layer ($d_{ins}$) and thickness of the polarization layer ($d_{pol}$) and breakdown field strength of the insulating layers $E_{ins}$ and breakdown field strength of the polarization layers $E_{pol}$ satisfy the following relations: $d_{ins} < d_{pol}$, and $E_{ins} > E_{pol}$.

In another embodiment of the present invention, the electrodes are made of copper, number m is equal to 1, a dielectric material of the insulating layers A is polyethylene, a material of the polarization layer B is a micro-dispersion PANI-DBSA/PAA, which synthesized using in situ polymerization of aniline in an aqueous dispersion of poly-acrylic acid (PAA) in the presence of dodecylbenzene sulfonate (DBSA), the ratio of PANI to PAA in the composite is equal to 20 wt %, or higher, thickness of the insulating layer is $d_{ins}$=25 nm, and thickness of the polarization layer $d_{pol}$=10 mm. In still another embodiment of the present invention, the electrodes are made of copper, number m is equal to 1, a dielectric material of the insulating layers A is polyethylene, a material of the polarization layer B is colloidal PANI dispersions stabilized with poly(N-vinylpyrrolidone) (PVP), thickness of the insulating layer is $d_{ins}$=25 nm, and thickness of the polarization layer $d_{cond}$=50 µm. In another embodiment of the present invention, polarization layers comprise surfactants which are selected from the list comprising dodecylbenzene sulfonate (DBSA), polyoxyethylene glycol alkyl ethers, polyoxypropylene glycol alkyl ethers, polyoxyethylene glycol octylphenol ethers, polyoxyethylene glycol sorbitan alkyl esters, sorbitan alkyl esters, dobecyldimethylamine oxide.

The present invention also provides a method of producing the capacitor as disclosed hereinabove. In one embodiment of the disclosed method, the step b) of formation of the multilayer structure comprises alternating steps of the application of a solution of an insulating material and the application of a solution of the polarization material, wherein both application steps are followed with a step of drying to form a solid insulating and polarization layers, the alternating steps are recurred until a formation of the multilayer structure is completed, and the insulating layer is formed as the first and the last layer being in direct contact with the electrodes. In another embodiment of the disclosed method, the step b) of formation of the multilayer structure comprises alternating steps of the application of a melt of an insulating material and the application of a melt of the polarization material, wherein both application steps are followed with a step of cooling down to form a solid insulating and polarization layers, the alternating steps are recurred until a formation of the multilayer structure is completed, and the insulating layers are formed as the first and the last layers being in direct contact with the electrodes. In yet another embodiment of the disclosed method, the step b) of formation of the solid multilayer structure comprises a step of coextrusion of set of the layers successively containing alternating polarization materials and insulating dielectric materials onto the substrate, followed by drying to form the solid multilayer structure. In still another embodiment of the disclosed method, the step b) of formation of the solid multilayer structure comprises a step of coextrusion of set of the layers successively containing alternating melts of polarization materials and insulating dielectric materials, followed with the step of cooling down to form the solid multilayer structure. The present invention also provides a method of producing the capacitor as disclosed hereinabove, which comprises the steps of d) coating of insulating layers on both electrodes, and e) coating of a multilayer structure on one of electrodes with lamination of second electrode to multilayer structure.

EXAMPLE 1

Figure 2:
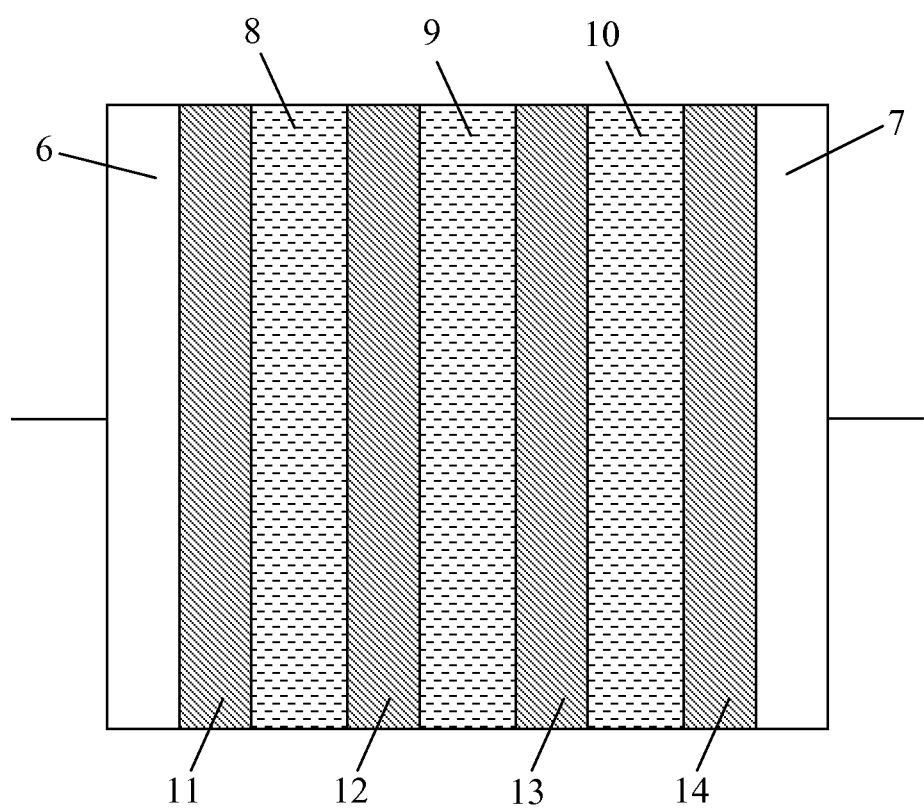
FIG. 2 schematically shows another energy storage device, in accordance with some embodiments of the present disclosure.

FIG. 2 shows an embodiment of the disclosed energy storage device that includes electrodes 1 and 2 and the solid multilayer structure comprising two insulating layers of an insulating dielectric material (3 and 4) separated with one polarization layer (5). In this embodiment of the present invention, composite of polyaniline, PANI-DBSA/PAA, synthesized using in situ polymerization of aniline in an aqueous dispersion of poly-acrylic acid (PAA) in the presence of dodecylbenzene sulfonate (DBSA) is used as the material of the polarization layer, and polyethylene is used as the insulating dielectric material. Thickness of the insulating layer $d_{ins}$=2.5 nm. The electrodes 10 and 11 are made of copper. Dielectric permittivity of polyethylene is equal to 2.2 (i.e. $\in_{ins}$=2.2). The composite of polyaniline, PANI-DBSA/PAA has the dielectric permittivity $\in_{pol}$ equal to 100,000 and thickness of the conductive layer possessing molecular conductivity is $d_{pol}$=1.0 mm.

EXAMPLE 2

FIG. 3 shows an embodiment of the disclosed energy storage device that includes electrodes 6 and 7 and the solid multilayer structure comprising alternating insulating and polarization layers, and wherein layers of an insulating dielectric material (11, 12, 13, 14) are separated by polarization layers (8, 9, 10). In this embodiment of the present invention, PANI-DBSA/PAA composite is used as a material of the polarization layers and polyethylene is used as an insulating dielectric material. Thickness of the insulating layer $d_{ins}$=2.5-1000 nm. Electrodes 6 and 7 are made of copper. The dielectric permittivity of polyethylene is equal to 2.2 (i.e. $\in_{ins}$=2.2) and breakdown voltage $V_{bd}$=40 kilovolt on thickness of 1 millimeter. In one embodiment the a material of the polarization layer is polyaniline (PANI)/poly (acrylic acid) (PAA) composite which has the dielectric permittivity $\in_{pol}$ equal to 100,000. In this example the thickness of the polarization layer $d_{pol}$=1.0-5.0 mm.

Although the present invention has been described in detail with reference to a particular preferred embodiment, persons possessing ordinary skill in the art to which this invention pertains will appreciate that various modifications and enhancements may be made without departing from the spirit and scope of the claims that follow.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A capacitor comprising
a first electrode;
a second electrode; and
a solid multilayer structure disposed between said first and second electrodes,
wherein the solid multilayer structure is in contact with said first and second electrodes and comprises layers disposed parallel to said electrodes, wherein the solid multilayer structure has a sequence of layers (A-B)$_m$-A, wherein A is an insulating layer and B is a polarization layer comprising a colloidal composite with a micro-dispersion of electro-conductive nano-particles in an insulator matrix, and m is a number greater than or equal to 1,
wherein A has a breakdown voltage of at least about 0.05 volts (V) per nanometer (nm), and
wherein B has dielectric permittivity of at least about 100.

2. A capacitor according to claim 1, wherein at least one of the insulating layers is crystalline.

3. A capacitor according to claim 1, wherein A has a breakdown voltage of at least about 0.5 V/nm.

4. A capacitor according to claim 1, wherein at least one of the insulating layers comprises a material selected from oxides, nitrides, oxynitrides and fluorides.

5. A capacitor according to claim 4, wherein at least one of the insulating layers comprises a material selected from $SiO_2$, $HfO_2$, $Al_2O_3$ or $Si_3N_4$.

6. A capacitor according to claim 1, wherein at least one of the insulating layers comprises a modified organic compounds of the general structural formula I:

{Cor}(M)$_n$,                    (I)

wherein Cor is a polycyclic organic compound, each M is independently a modifying functional group; and n is a number of the modifying functional groups that is greater than or equal to zero.

7. A capacitor according to claim 6, wherein the polycyclic organic compound is selected from the group consisting of oligophenyl, imidazole, pyrazole, acenaphthene, triaizine, indanthrone and structures 1-43:

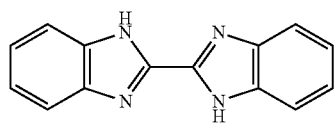
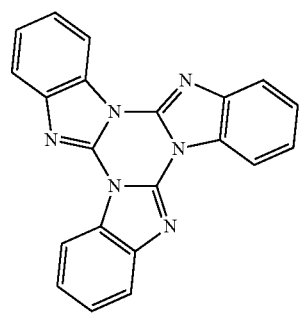
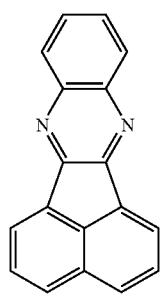
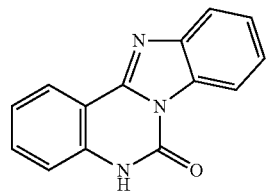
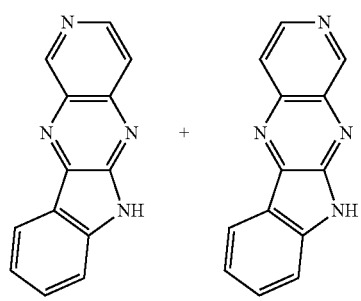
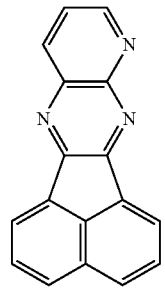
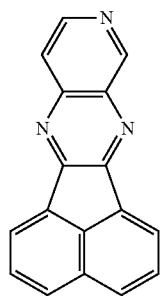
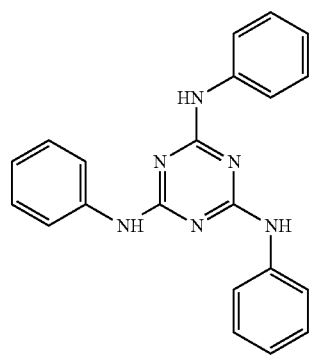

-continued
9
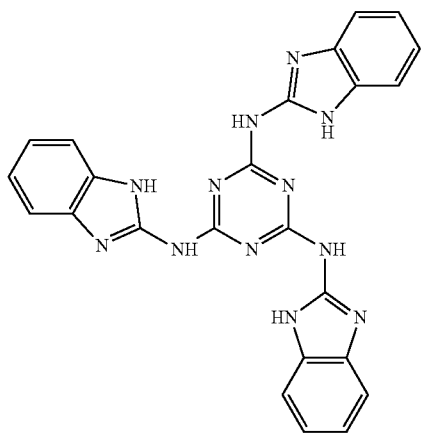
10
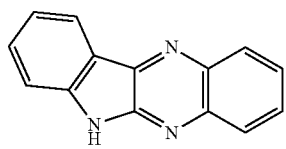
11
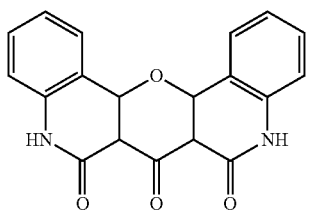
12
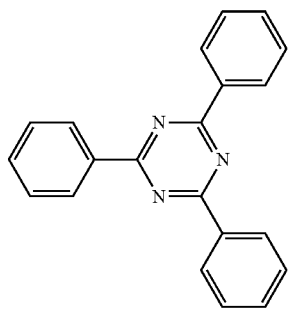
13
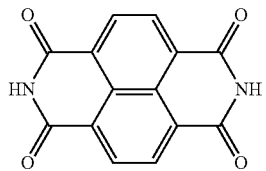
14
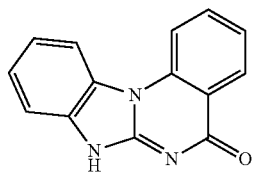
15
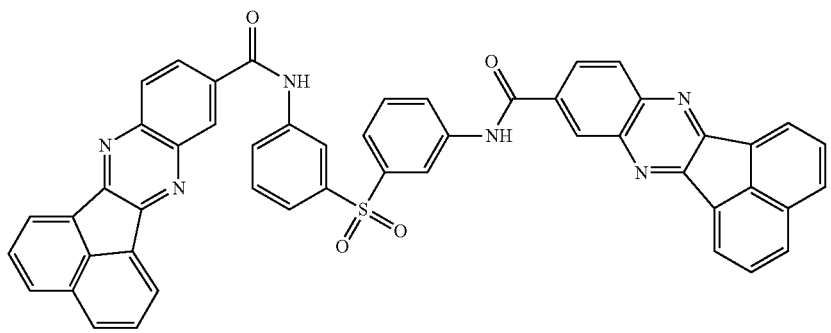
16
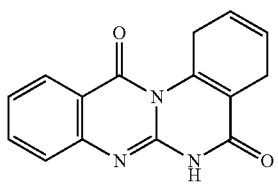
17
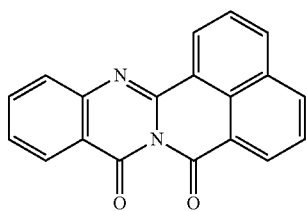

-continued
18
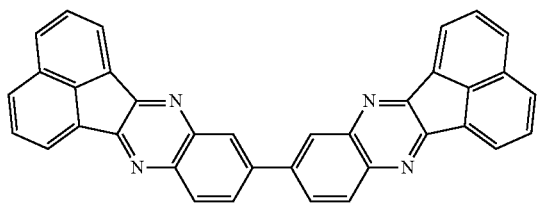
19
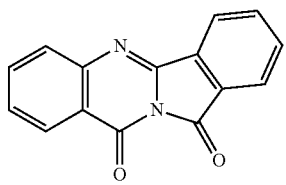
20
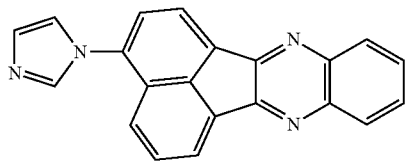
21
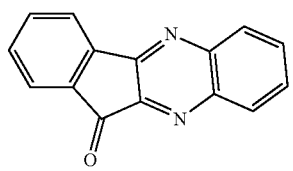
22
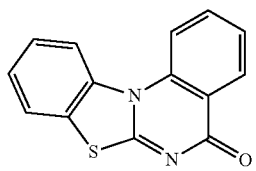
23
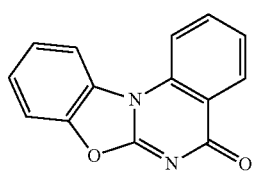
24
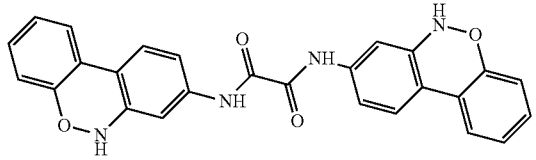
25
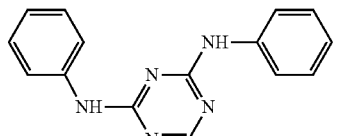
26
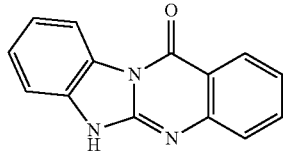
27
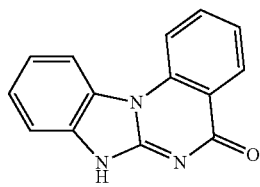
28
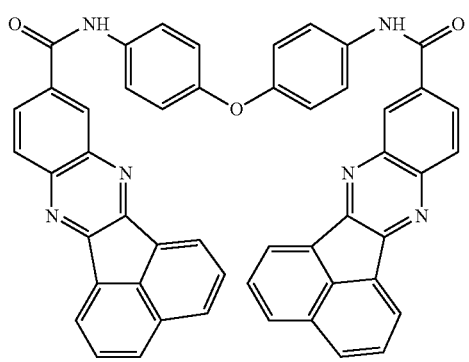
29
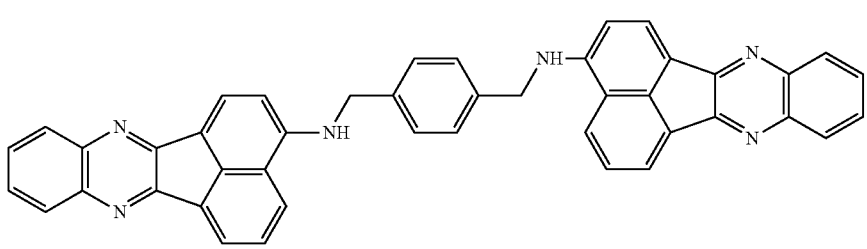

-continued
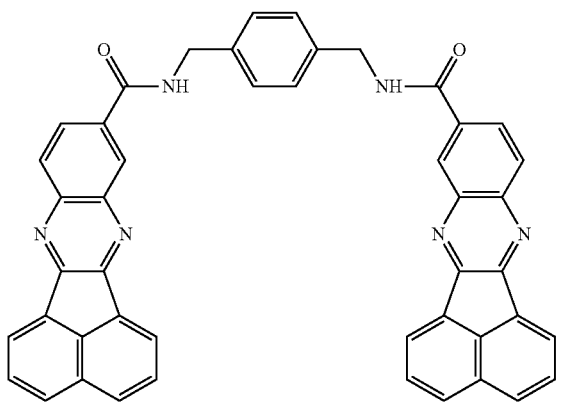
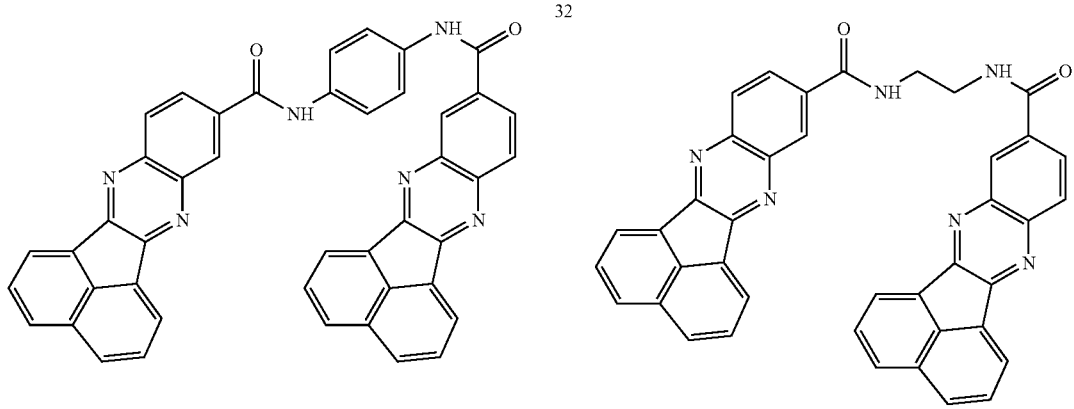
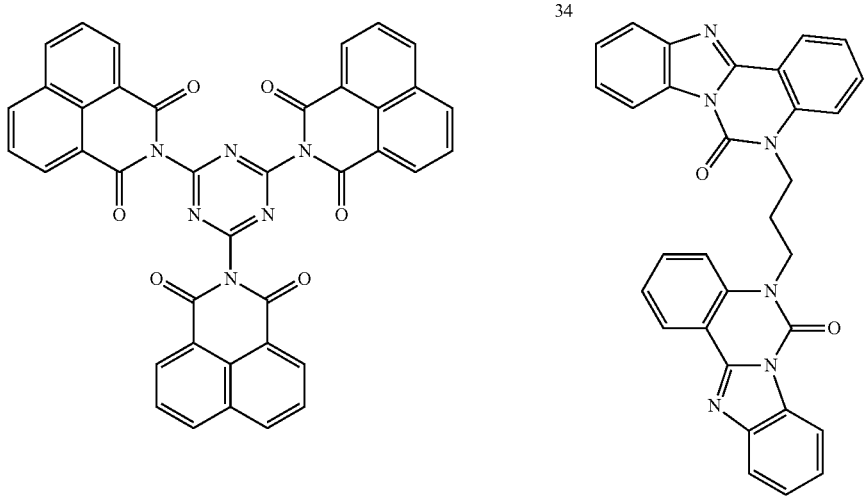

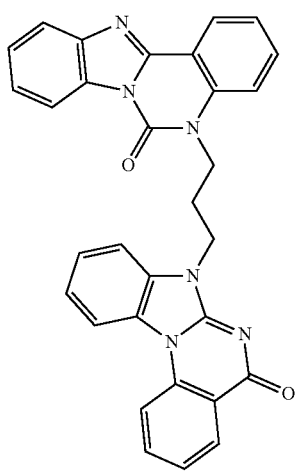
36

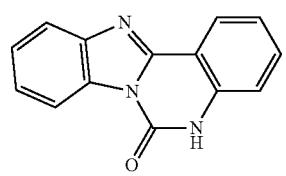
37

-continued

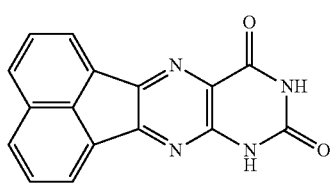
38

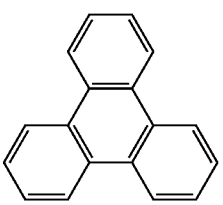
39

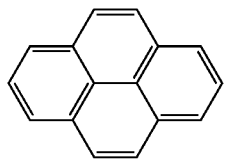
40

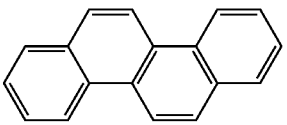
41

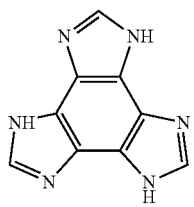
41

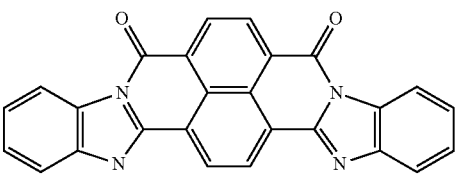
42

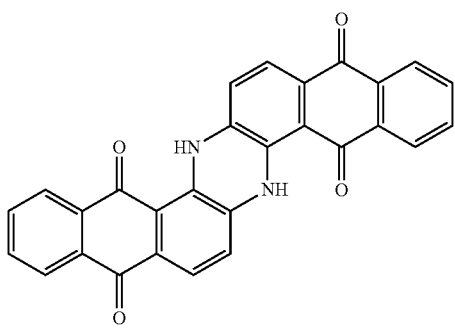
43

8. A capacitor according to claim 6 or 7, wherein the modifying functional groups are selected from the group consisting of alkyl, aryl, substituted alkyl, and substituted aryl.

9. A capacitor according to claim 1, wherein at least one of the insulating layers comprises a compound selected from the group consisting of fluorinated alkyls, polyethylene, kevlar, poly(vinylidene fluoride-hexafluoropropylene), polypropylene, fluorinated polypropylene, and polydimethylsiloxane.

10. A capacitor according to claim 1, wherein at least one of the insulating layers comprises a material having a structure selected from the structures 44 to 49:

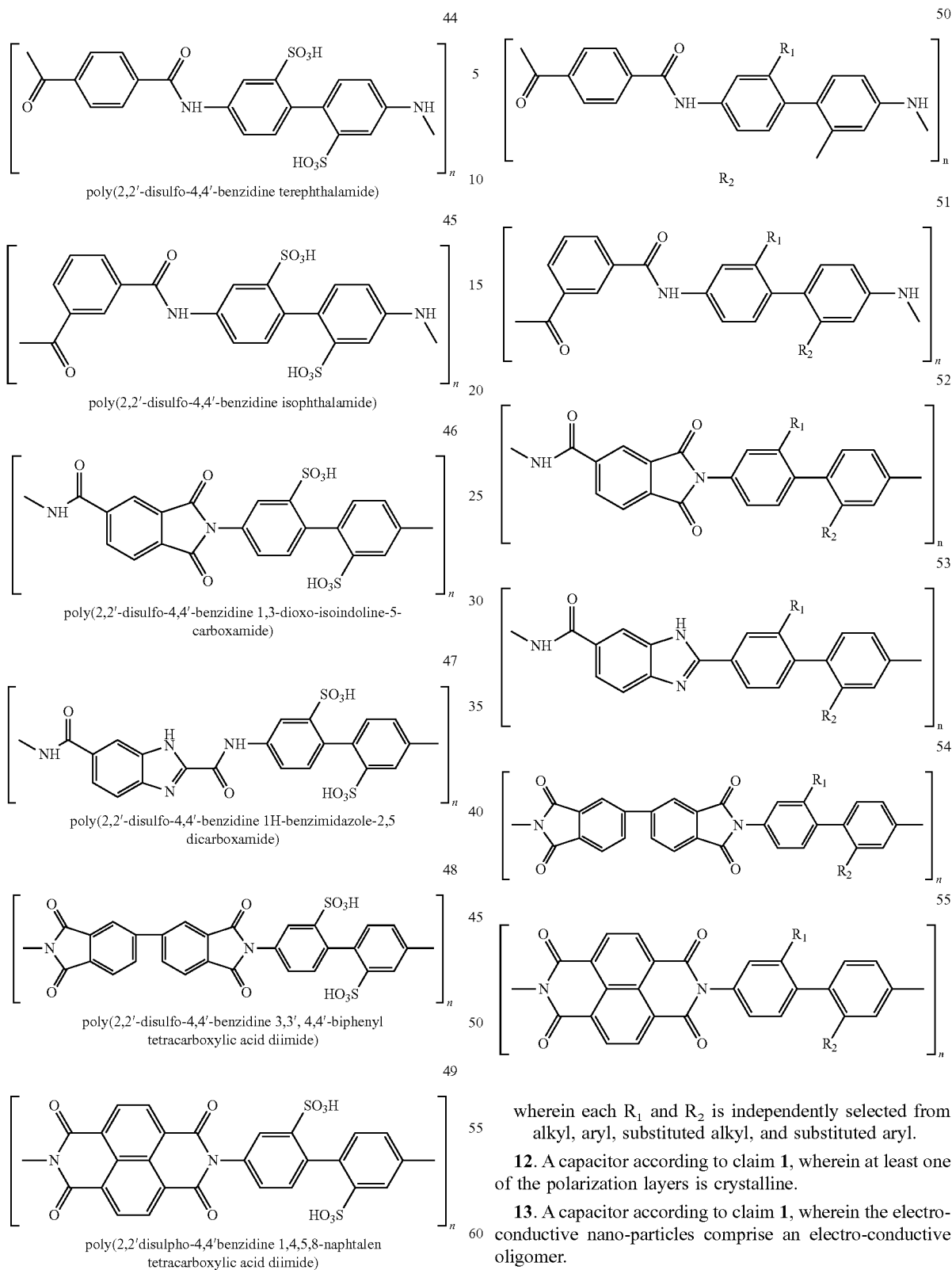

wherein each $R_1$ and $R_2$ is independently selected from alkyl, aryl, substituted alkyl, and substituted aryl.

12. A capacitor according to claim 1, wherein at least one of the polarization layers is crystalline.

13. A capacitor according to claim 1, wherein the electro-conductive nano-particles comprise an electro-conductive oligomer.

14. A capacitor according to claim 13, wherein longitudinal axis of the electro-conductive oligomer is directed perpendicularly in relation to an electrode surface.

15. A capacitor according to claim 13, wherein the electro-conductive oligomer is one of structures 57 to 63:

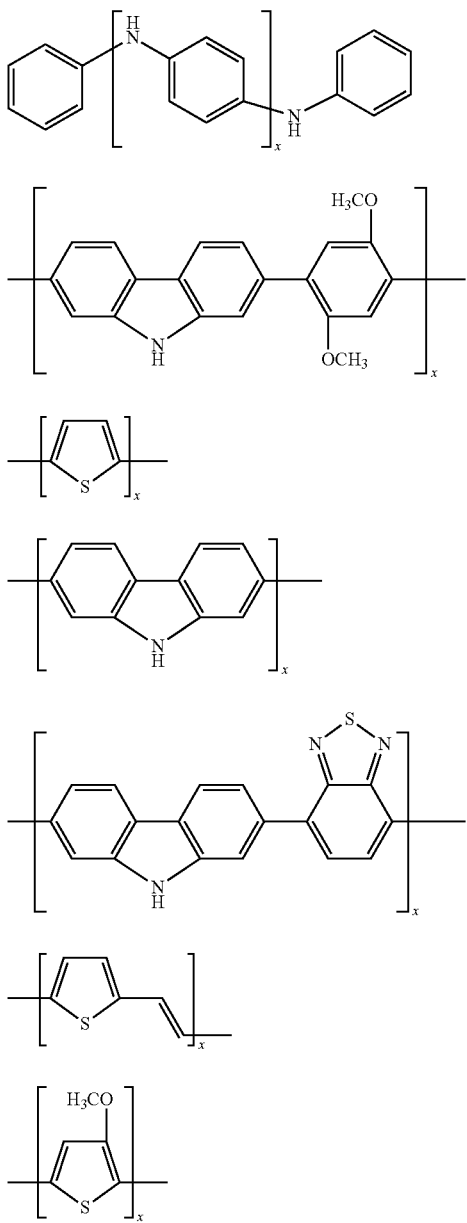

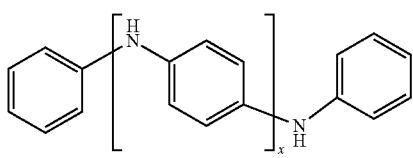

wherein X =2, 3, 4, 5, 6, 7, 8, 9, 10, 11 or 12.

16. A capacitor according to claim 1, wherein the electro-conductive nano-particles comprise a low-molecular weight electro-conductive polymer.

17. A capacitor according to claim 16, wherein the low-molecular weight electro-conductive polymer comprises a monomer corresponding to one of structures 57 to 63:

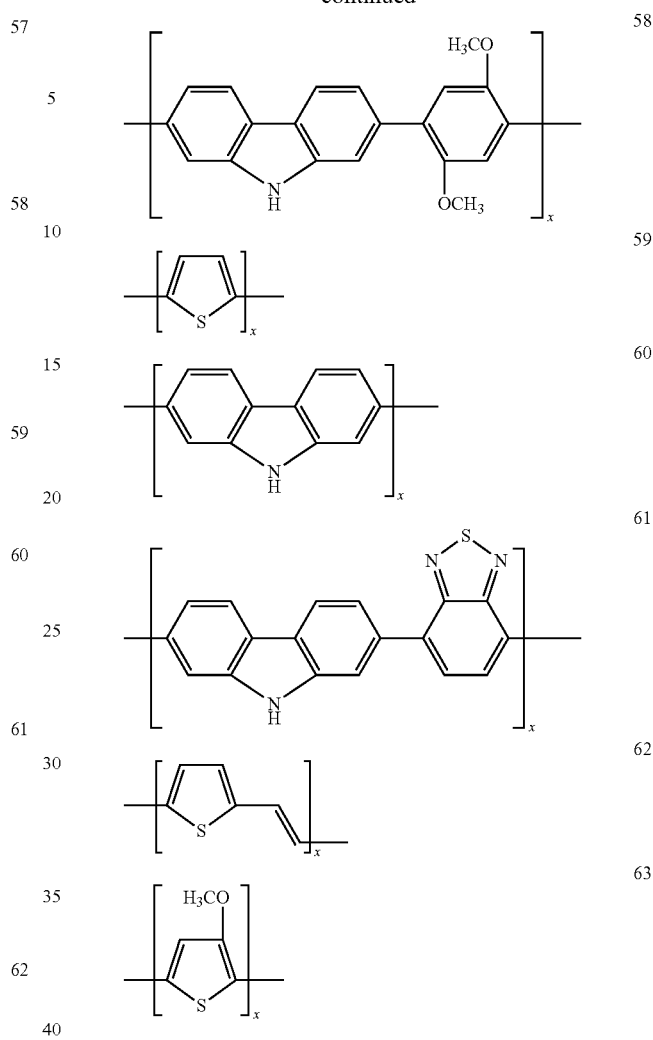

wherein X =2, 3, 4, 5, 6, 7, 8, 9, 10, 11 and 12.

18. A capacitor according to claim 13, wherein the electro-conductive oligomer is of formula:

$$\text{(electroconductive oligomer)-R}_q \qquad \text{(II)}$$

wherein $R_q$ is a substitute group, and q is a number that is greater than or equal to zero.

19. A capacitor according to claim 18, wherein each R is independently an alkyl, aryl, substituted alkyl, or substituted aryl.

20. A capacitor according to claim 1, wherein a material of the insulator matrix is selected from the group consisting of poly (acrylic acid) (PAA), poly(N-vinylpyrrolidone) (PVP), poly(vinylidene fluoride-hexafluoropropylene) [P(VDF-HFP)], ethylene propylene polymers, which include ethylene propylene rubber (EPR) and ethylene propylene diene monomer (EPDM), and silicone rubber (PDMSO) such as dimethyldicloro siloxane, dimethylsilane diol, and polydimethyl siloxane.

21. A capacitor according to claim 1, wherein at least one of the electrodes comprises Pt, Cu, Al, Ag, Au, Ti, W, Zn, Ni or a low-melting temperature alloy.

22. A capacitor according to claim 1, wherein the thickness of the insulating layer ($d_{ins}$) and thickness of the polarization layer ($d_{pol}$) and breakdown field strength of the insulating layers $E_{ins}$ and breakdown field strength of the polarization layers $E_{pol}$ satisfy the following relations: $d_{ins} < d_{pol}$, and $E_{ins} > E_{pol}$.

23. A capacitor according to claim 1, wherein the electrodes comprise copper, m is greater than or equal to 1, a dielectric material of the insulating layers A is polyethylene, a material of the polarization layer B is a micro-dispersion PANI-DBSA/PAA, the ratio of PANI to PAA in the composite is greater than or equal to about 20wt %, a thickness of the insulating layer ($d_{ins}$) is at least about 2.5 nm, and a thickness of the polarization layer ($d_{pol}$) is at least about 1.0 mm.

24. A capacitor according to claim 1, wherein the electrodes comprise copper, m is greater than or equal to 1, a dielectric material of the insulating layers A is polyethylene, a material of the polarization layer B is colloidal PANI dispersions stabilized with poly(N-vinylpyrrolidone) (PVP), a thickness of the insulating layer ($d_{ins}$) is from 2.5 nm to 1000 nm, and a thickness of the polarization layer ($d_{cond}$) is from 10 micrometer (μm) to 50 μm.

25. A capacitor according to claim 1, wherein said polarization layers comprise a surfactant selected from: dodecylbenzene sulfonate (DBSA), polyoxyethylene glycol alkyl ethers, polyoxypropylene glycol alkyl ethers, polyoxyethylene glycol octylphenol ethers, polyoxyethylene glycol sorbitan alkyl esters, sorbitan alkyl esters, and dobecyldimethylamine oxide.

26. A method of producing a capacitor, comprising:
a) preparing a conducting substrate serving as a first electrode;
b) forming a solid multilayer structure adjacent to the first electrode; and
c) forming a second electrode adjacent to the multilayer structure, wherein formation of the multilayer structure comprises alternating operations of the application of insulating and polarization layers or an operation of coextrusion of the insulating and polarization layers, wherein the polarization layer is a colloidal composite with a micro-dispersion of electro-conductive nanoparticles in an insulator matrix, wherein an individual insulating layer has a breakdown voltage of at least about 0.05 volts per nanometer (nm) and an individual polarization layer has dielectric permittivity of at least about 100.

27. A method according to claim 26, wherein forming the solid multilayer structure comprises alternating operations of the application of a solution of an insulating material and the application of a solution of the polarization material, wherein both application operations are followed with an operation of drying to form a solid insulating and polarization layers, the alternating operations are recurred until a formation of the multilayer structure is completed, and the insulating layer is formed as the first and the last layer being in direct contact with the electrodes.

28. A method according to claim 26, wherein forming the solid multilayer structure comprises alternating operations of the application of a melt of an insulating material and the application of a melt of the polarization material, wherein both application operations are followed with an operation of cooling down to form a solid insulating and polarization layers, and wherein the alternating operations are recurred until a formation of the multilayer structure is completed, and the insulating layers are formed as the first and the last layers being in direct contact with the electrodes.

29. A method according to claim 26, wherein forming the solid multilayer structure comprises an operation of coextrusion of at least one set of the layers successively containing alternating polarization materials and insulating dielectric materials onto the substrate, followed by drying to form the solid multilayer structure.

30. A method according to claim 26, wherein forming the solid multilayer structure comprises an operation of coextrusion of set of the layers successively containing alternating melts of polarization materials and insulating dielectric materials, followed with the step of cooling down to form the solid multilayer structure.

31. A method of producing a capacitor, which comprises:
a) coating insulating layers on first and second electrodes; and
b) coating a multilayer structure on an insulating layer on one of the first and second electrodes with the lamination of the other of the first and second electrodes to the multilayer structure,
wherein an individual insulating layer has a breakdown voltage of at least about 0.05 volts per nanometer (nm) and the multilayer structure comprises a polarization layer having a dielectric permittivity of at least about 100,
wherein the polarization layer is a colloidal composite with a micro-dispersion of electro-conductive nanoparticles in an insulator matrix.

* * * * *